US012574144B2

(12) United States Patent
Li et al.

(10) Patent No.: US 12,574,144 B2
(45) Date of Patent: Mar. 10, 2026

(54) CHANNEL STATE INFORMATION REPORTING METHOD, CHANNEL STATE INFORMATION RECEIVING METHOD, COMMUNICATION NODE, AND STORAGE MEDIUM

(71) Applicant: ZTE CORPORATION, Guangdong (CN)

(72) Inventors: Yong Li, Guangdong (CN); Hao Wu, Guangdong (CN); Zhaohua Lu, Guangdong (CN); Yuxin Wang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 314 days.

(21) Appl. No.: 18/547,146

(22) PCT Filed: Feb. 16, 2022

(86) PCT No.: PCT/CN2022/076485
§ 371 (c)(1),
(2) Date: Aug. 18, 2023

(87) PCT Pub. No.: WO2022/193895
PCT Pub. Date: Sep. 22, 2022

(65) Prior Publication Data
US 2024/0171303 A1     May 23, 2024

(30) Foreign Application Priority Data

Mar. 19, 2021   (CN) ......................... 202110296817.8

(51) Int. Cl.
*H04L 1/00* (2006.01)
*H04L 5/00* (2006.01)
*H04L 27/26* (2006.01)

(52) U.S. Cl.
CPC .......... *H04L 1/0026* (2013.01); *H04L 5/0048* (2013.01); *H04L 5/0051* (2013.01); (Continued)

(58) Field of Classification Search
CPC ... H04L 1/0026; H04L 5/0048; H04L 5/0051; H04L 5/0057; H04L 5/0094; H04L 27/2613
See application file for complete search history.

(56) References Cited

U.S. PATENT DOCUMENTS

2018/0184310 A1   6/2018  Fu et al.
2018/0198510 A1   7/2018  Park et al.
(Continued)

FOREIGN PATENT DOCUMENTS

CN       106341171 A      1/2017
CN       107852301 A      3/2018
(Continued)

OTHER PUBLICATIONS

3GPP TS 38.211 V16.3.0, "3rd Generation Partnership Project; Technical Specification Group Radio Access Network; NR; Physical channels and modulation (Release 16)," Sep. 2020, 133 pages.
(Continued)

*Primary Examiner* — Joshua Kading
(74) *Attorney, Agent, or Firm* — MH2 TECHNOLOGY LAW GROUP LLP

(57)                ABSTRACT

A channel state information reporting method, including: receiving configuration information, the configuration information includes first configuration information and second configuration information, the first configuration information is used to indicate a position of a channel state information reference signal resource, and the second configuration information is used to indicate a reporting parameter of channel state formation; receiving a channel state infor-
(Continued)

Receive configuration information, the configuration information includes first configuration information and second configuration information, the first configuration information is used to indicate a position of a channel state information reference signal resource, and the second configuration information is used to indicate a reporting parameter of channel state information ⌐⌐110

Receive channel state information reference signal according to the first configuration information ⌐⌐120

Report the channel state information according to the second configuration information and a measurement of the channel state information reference signal ⌐⌐130 mation reference signal according to the first configuration information; and reporting the channel state information according to the second configuration information and a measurement of the channel state information reference signal.

19 Claims, 2 Drawing Sheets

(52) U.S. Cl.
CPC .......... *H04L 5/0057* (2013.01); *H04L 5/0094* (2013.01); *H04L 27/2613* (2013.01)

(56) References Cited

U.S. PATENT DOCUMENTS

| | | | | |
|---|---|---|---|---|
| 2019/0273544 | A1 | 9/2019 | Cha et al. | |
| 2020/0083937 | A1* | 3/2020 | Rahman | H04B 7/0478 |
| 2020/0280420 | A1 | 9/2020 | Li et al. | |
| 2021/0135725 | A1 | 5/2021 | Kim et al. | |
| 2021/0167835 | A1* | 6/2021 | Wang | H04B 7/10 |
| 2023/0145057 | A1* | 5/2023 | Zhang | H04B 7/0626 |
| | | | | 370/329 |
| 2024/0048325 | A1* | 2/2024 | Hao | H04L 5/005 |
| 2024/0056147 | A1* | 2/2024 | Faxer | H04L 5/005 |
| 2024/0088954 | A1* | 3/2024 | Athley | H04B 7/0469 |

FOREIGN PATENT DOCUMENTS

| | | |
|---|---|---|
| CN | 109474406 A | 3/2019 |
| CN | 110741583 A | 1/2020 |
| WO | 2018139785 A1 | 8/2018 |

OTHER PUBLICATIONS

3GPP TS 38.214 V16.3.0, "3rd Generation Partnership Project; Technical Specification Group Radio Access Network; NR; Physical layer procedures for data (Release 16)," Sep. 2020, 166 pages.

3GPP TS 38.331 V16.3.0, "3rd Generation Partnership Project; Technical Specification Group Radio Access Network; NR; Radio Resource Control (RRC) protocol specification (Release 16)," Dec. 2020, 932 pages.

3GPP TSG RAN WG1, "Meeting #104-e: RAN1 Chairman's Notes," Jan. 25-Feb. 5, 2021, 158 pages.

International Search Report and Written Opinion dated Apr. 22, 2022 in corresponding International Application No. PCT/CN2022/076485, translated, 15 pages.

European Extended Search Report dated Aug. 16, 2024 in corresponding European Application No. 22770250.3, 12 pages.

ZTE "On CSI-RS for CSI acquisition," 3GPP TSG RAN WG1 Meeting #90, Prague, Czechia, 6 pages [retrieved on Aug. 20, 2017]. Retrieved from the Internet: <URL:http://www.3gpp.org/ftp/Meetings_3GPP_SYNC/RAN1/Docs/>, Aug. 21-25, 2017.

Nokia et al. "Enhancement on CSI measurement and reporting," GPP TSG RAN WG1 Meeting #104-e, e-Meeting, 21 pages [retrieved on Jan. 18, 2021]. Retrieved from the Internet: <URL:https://ftp.3gpp.org/tsg_ran/WG1_RL1/TSGR1_104-e/Docs/R1-2101011.zip>, Jan. 25-Feb. 5, 2021.

Nokia "Introduction of NR enhanced MIMO," 3GPP TSG-RAN WG1 Meeting #99, Reno, Nevada, USA, 46 pages [retrieved on Nov. 12, 2019]. Retrieved from the Internet: <URL:https://ftp.3gpp.org/tsg_ran/WG1_RL1/TSGR1_99/Docs/R1-1913203.zip>, Nov. 18-22, 2019.

CATT "Further discussion on CSI enhancements for Rel-17," 3GPP TSG RAN WG1 Meeting #104-e, e-Meeting, 16 pages [retrieved on Jan. 19, 2021]. Retrieved from the Internet: <URL:https://ftp.3gpp.org/tsg_ran/WG1_RL1/TSGR1_104-e/Docs/R1-2100349.zip>, Jan. 25-Feb. 5, 2021.

* cited by examiner

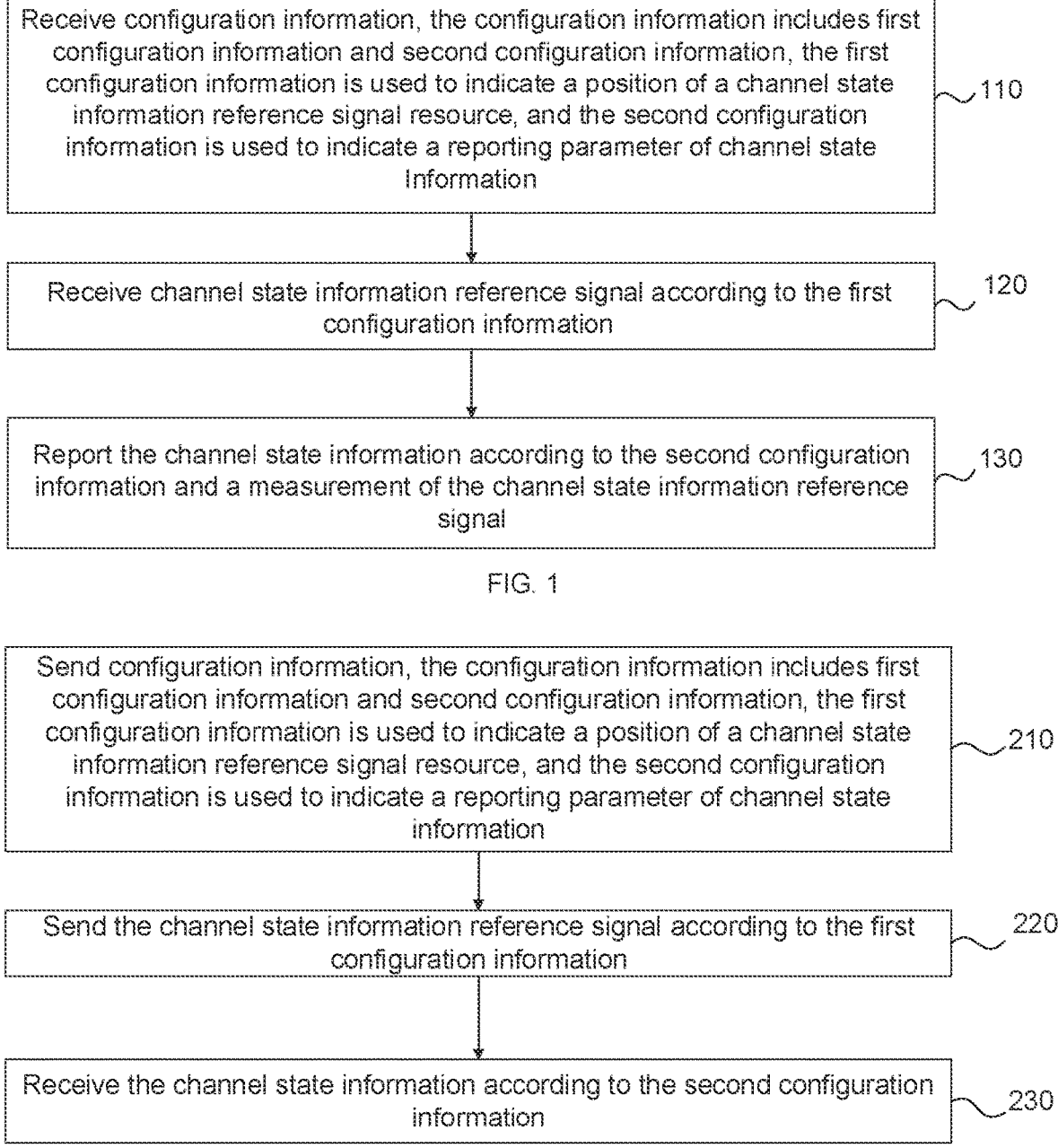

Receive configuration information, the configuration information includes first configuration information and second configuration information, the first configuration information is used to indicate a position of a channel state information reference signal resource, and the second configuration information is used to indicate a reporting parameter of channel state Information ⟿110

Receive channel state information reference signal according to the first configuration information ⟿120

Report the channel state information according to the second configuration information and a measurement of the channel state information reference signal ⟿130

FIG. 1

Send configuration information, the configuration information includes first configuration information and second configuration information, the first configuration information is used to indicate a position of a channel state information reference signal resource, and the second configuration information is used to indicate a reporting parameter of channel state information ⟿210

Send the channel state information reference signal according to the first configuration information ⟿220

Receive the channel state information according to the second configuration information ⟿230

FIG. 2

CHANNEL STATE INFORMATION REPORTING METHOD, CHANNEL STATE INFORMATION RECEIVING METHOD, COMMUNICATION NODE, AND STORAGE MEDIUM

CROSS-REFERENCE TO RELATED APPLICATION(S)

This application is a national phase entry under 35 U.S.C 371 of International Patent Application No. PCT/CN2022/076485 filed on Feb. 16, 2022, the International Patent Application is filed based on Chinese Patent Application with the application No. 202110296817.8, filed on Mar. 19, 2021, and claims priority to the Chinese Patent Application, the entire contents of the International Patent Application and the Chinese Patent Application are incorporated herein by reference.

TECHNICAL FIELD

The present disclosure relates to the field of wireless communication networks, and for example, to a channel state information reporting method, a channel state information receiving method, a communication node, and a storage medium.

BACKGROUND

In a wireless communication system, the process for reporting channel state information (CSI) includes: sending, by a base station, a channel state information reference signal (CSI-RS); measuring, by a terminal, the CSI-RS; determining, by the terminal, CSI between the terminal and the base station and reporting the CSI to the base station; and determining, by the base station, a data transmission strategy and transmitting data based on the channel state represented by the CSI, thereby improving the data transmission efficiency and communication quality. The accuracy of the channel state represented by the CSI affects the transmission strategy of the base station, thereby affecting the data transmission efficiency and communication quality. In one slot, there are multiple CSI-RSs and multiple demodulation reference signals (DM-RS). If a number of time-domain orthogonal frequency division multiplexing (OFDM) symbols occupied by CSI-RS in one slot is large, it is susceptible to a collision with a DM-RS. Since a time-domain resource for carrying a CSI-RS is fixed, in order to reduce the possibility of a collision between CSI-RS and DM-RS, only the opportunity for scheduling CSI-RS can be reduced, which leads to the inflexible scheduling and transmission of CSI-RS, thereby affecting the efficiency and performance of reporting CSI in the system.

SUMMARY

The present disclosure provides a channel state information reporting method, a channel state information receiving method, a communication node, and a storage medium. The efficiency and performance for reporting CSI are improved by flexibly indicating a position of a CSI-RS resource and indicating a reporting parameter of the CSI.

The embodiments of the present disclosure provide a channel state information reporting method, including:

receiving configuration information, the configuration information includes first configuration information and second configuration information, the first configuration information is used to indicate a position of a channel state information reference signal resource, and the second configuration information is used to indicate a reporting parameter of channel state information; receiving a channel state information reference signal according to the first configuration information; and reporting the channel state information according to the second configuration information and a measurement of the channel state information reference signal.

The embodiments of the present disclosure further provide a channel state information receiving method, including:

sending configuration information, the configuration information includes first configuration information and second configuration information, the first configuration information is used to indicate a position of a channel state information reference signal resource, the second configuration information is used to indicate a reporting parameter of channel state information; sending a channel state information reference signal according to the first configuration information; and receiving the channel state information according to the second configuration information.

The embodiments of the present disclosure further provide a communication node, including: a memory, a processor, and a computer program stored in the memory and runnable on the processor, in response that the processor executes the program, the channel state information reporting method or the channel state information receiving method mentioned above is implemented.

The embodiments of the present disclosure further provide a computer-readable storage medium, the computer-readable storage medium has stored a computer program thereon, in response that the program is executed by a processor, the channel state information reporting method or the channel state information receiving method mentioned above is implemented.

BRIEF DESCRIPTION OF THE DRAWINGS

FIG. 1 is a flowchart of a channel state information reporting method provided by an embodiment;

FIG. 2 is a flowchart of a channel state information receiving method provided by an embodiment;

DETAILED DESCRIPTION

Figure 3:
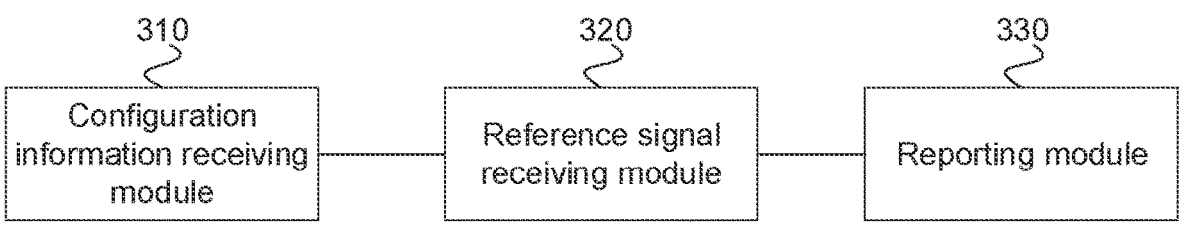
FIG. 3 is a schematic structural diagram of a channel state information reporting device provided by an embodiment.

The present disclosure will be described below in conjunction with the accompanying drawings and embodiments. The specific embodiments described herein are intended solely to illustrate the present disclosure. For ease of description, only parts relevant to the present disclosure are shown in the drawings.

In OFDM technologies, the smallest frequency-domain unit is a sub-carrier, and the smallest time-domain unit is an OFDM symbol. For a frequency-domain resource, a resource block (RB) is defined as a specific number of continuous sub-carriers, and a bandwidth part (BWP) is defined as another specific number of continuous resource blocks on a carrier; for a time-domain resource, a slot is defined as another specific number of continuous OFDM symbols.

A reference signal transmitted from a base station to a terminal is a downlink reference signal. In the long-term evolution (LTE) system, a downlink reference signal for reporting channel state information includes a cell-specific reference signal (CRS) and a CSI-RS. In the NR system, a downlink reference signal for reporting channel state information includes CSI-RS. CSI-RS is carried by a channel state information reference signal resource (CSI-RS Resource), and CSI-RS resource is composed of code division multiplexing groups (Code Division Multiplexing Group, referred to as CDM group for short). A CDM group is composed of radio resource elements. A multiplexing manner of CSI-RSs of a group of CSI-RS ports on one CDM group is code division multiplexing.

A content of CSI transmitted from the terminal to the base station includes: a channel quality indicator (CQI), which is used to indicate the quality of the channel; may also include a precoding matrix indicator (PMI), which is used to indicate a precoding matrix applied to the base station antenna. A reporting format of a type of CQI is wideband CQI reporting, that is, channel quality is reported for the channel state information reporting band (CSI Reporting Band), and the channel quality corresponds to the entire channel state information reporting band; a reporting format of another type of CQI is subband CQI reporting, that is, a quality is given channel qualities for each subband of the channel state information reporting frequency band, and each of the channel qualities corresponds to a subband, that is, a channel quality is reported for each of the subbands of the channel state information reporting frequency band. A subband is a frequency-domain unit, defined as N continuous resource blocks, where N is a positive integer. In the embodiments of the present disclosure, a subband is also referred to as a channel quality indicator subband, or a CQI subband. A bandwidth part (BWP) is divided into subbands, and a channel state information reporting frequency band is defined as a subset of the subbands of the bandwidth part. The channel state information reporting frequency band is a frequency band of which the channel state information needs to be reported.

Similarly, a reporting format of a type of PMI is a wideband PMI report, that is, a PMI is reported for the channel state information reporting frequency band, and the PMI corresponds to the entire channel state information reporting frequency band; a reporting format of another type of PMI is a subband PMI report, that is, a PMI is reported for each of the subbands of the channel state information reporting frequency band, or a component of a PMI is reported for each of the subbands of the channel state information reporting frequency band. For example, a PMI consists of X1 and X2, and one way to report a component of the PMI for each of the subbands of the channel state information reporting frequency band is to report an X1 for the entire frequency band and report an X2 for each of the subbands, or report an X1 and an X2 for each of the subbands. There is a reporting format of another type of PMI: the reported PMI indicates R precoding matrices for each subband, where R is a positive integer. In the sense of frequency-domain granularity of the feedback precoding matrix, R can also be understood as a quantity of precoding matrix subbands included in each subband.

In the CSI reporting process of the wireless communication system, a CSI-RS resource for carrying a CSI-RS and a feedback mechanism for the terminal to provide CSI to the base station affect the accuracy of channel state feedback as well as the transmission strategy of the base station, and further affect the data transmission efficiency and communication quality. In the related art, a resource carrying a CSI-RS and the CSI feedback mechanism are fixed, in order to ensure the reliable transmission of CSI-RS and avoid a collision between CSI-RS and other signals or data, only the scheduling opportunities of CSI-RS can be reduced, thus causing the scheduling and transmission of CSI-RS not flexible.

The embodiments of the present disclosure provide a channel state information reporting method, where the method can be applied to a terminal. FIG. 1 is a flowchart of a channel state information reporting method provided by an embodiment. As shown in FIG. 1, the method provided by the embodiment includes step 110 to step 130.

In step 110, configuration information is received, where the configuration information includes first configuration information and second configuration information, the first configuration information is used to indicate a position of a channel state information reference signal resource, and the second configuration information is used to indicate a reporting parameter of channel state information.

In step 120, a channel state information reference signal is received according to the first configuration information.

In step 130, the channel state information is reported according to the second configuration information and a measurement of the channel state information reference signal.

In this embodiment, the first configuration information is used to indicate the position of the CSI-RS resource, for example, the CSI-RS resource includes multiple CDM groups, and the first configuration information is used to indicate multiple CDM groups, a CDM group with index 0, or a frequency-domain sub-carrier position and a time-domain OFDM symbol position of each CDM group. The second configuration information is used to indicate the reporting parameter of the CSI. For example, in a case where the terminal reports a PMI to the base station, the second configuration information includes a parameter corresponding to a precoding matrix, such as a quantity of CSI-RS ports, an index of a discrete fourier transform (DFT) vector corresponding to a precoding matrix and/or a parameter of a DFT vector group corresponding to a precoding matrix, etc.

On this basis, the terminal receives CSI-RS on the corresponding CSI-RS resource according to an indication of the first configuration information, and reports the CSI to the base station according to an indication of the second configuration information, so as to feed back the channel state, thus improving the flexibility of CSI-RS scheduling and transmission, and simplifying the complexity of the CSI reporting process, thereby improving the efficiency and performance of CSI reporting.

In an embodiment, the CSI-RS resource includes K CDM groups, where K is a positive integer; the first configuration information includes a frequency-domain sub-carrier position parameter and a time-domain OFDM symbol position parameter of the CDM group.

In this embodiment, CSI-RS is carried by the CSI-RS resource, the CSI-RS resource is composed of the K CDM groups, and a position of a CDM group is determined by (k, l), where $\bar{k}$ represents a frequency-domain sub-carrier position, and $\bar{l}$ represents a time-domain OFDM symbol position, and (k,l) is indicated by the first configuration information.

In an embodiment, candidate positions of the CSI-RS resource include the following eight cases.

Case 1: a quantity of CSI-RS ports is 32 and a size of a CDM group of the K CDM groups is 2, K=16; positions of the K CDM groups are $(k_0, l_0)$, $(k_1, l_0)$, $(k_2, l_0)$, $(k_3, l_0)$, $(k_0, l_0+1)$, $(k_1, l_0+1)$, $(k_2, l_0+1)$, $(k_3, l_0+1)$, $(k_0+12, l_0)$, $(k_1+12, l_0)$, $(k_2+12, l_0)$, $(k_3+12, l_0)$, $(k_0+12, l_0+1)$, $(k_1+12, l_0+1)$, $(k_2+12, l_0+1)$, $(k_3+12, l_0+1)$, respectively, corresponding CDM group indices are 0, 1, 2, 3, 4, 5, 6, 7, 8, 9, 10, 11, 12, 13, 14, 15, respectively; or, positions of the K CDM groups are $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, $(k_0, l_0+1)$, $(k_1, l_0+1)$, $(k_2, l_0+1)$, $(k_3, l_0+1)$, $(k_0+12, l_0+1)$, $(k_1+12, l_0+1)$, $(k_2+12, l_0+1)$, $(k_3+12, l_0+1)$, respectively, CDM group indices corresponding to the K CDM groups are 0, 1, 2, 3, 4, 5, 6, 7, 8, 9, 10, 11, 12, 13, 14, 15, respectively. A first parameter in (,) represents a frequency-domain sub-carrier position of the CDM group, and a second parameter in (,) represents a time-domain OFDM symbol position. $k_0$, $k_1$, $k_2$ and $k_3$ are frequency-domain sub-carrier position parameters, and $l_0$ is a time-domain OFDM symbol position parameter. Since values of $k_i$ (i=0, 1, 2, 3) and $l_0$ are given by the first configuration information, position $(\bar{k}, \bar{l})$ of the above-mentioned CDM group is indicated by the first configuration information, and thus, a position of the CSI-RS is indicated.

Case 2: a quantity of CSI-RS ports is 32 and a size of a CDM group of the K CDM groups is 4, K=8; positions of the K CDM groups are: $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, respectively; CDM group indices corresponding to the K CDM groups are 0, 1, 2, 3, 4, 5, 6, 7, respectively. A first parameter in (,) represents a frequency-domain sub-carrier position of the CDM group, and a second parameter in (,) represents a time-domain OFDM symbol position. $k_0$, $k_1$, $k_2$ and $k_3$ are frequency-domain sub-carrier position parameters, and $l_0$ is a time-domain OFDM symbol position parameter. Since values of $k_i$ (i=0, 1, 2, 3) and $l_0$ are given by the first configuration information, position $(\bar{k}, \bar{l})$ of the above-mentioned CDM group is indicated by the first configuration information, and thus, a position of CSI-RS is indicated.

Case 3: a quantity of CSI-RS ports is 32 and a size of a CDM group of the K CDM groups is 8, K=4; positions of the K CDM groups are: $(k_0, l_0)$, $(k_1, l_0)$, $(k_0+12, l_0)$, $(k_1+12, l_0)$, respectively; corresponding CDM group indices are 0, 1, 2, 3, respectively. A first parameter in (,) represents a frequency-domain sub-carrier position of the CDM group, and a second parameter in (,) represents a time-domain OFDM symbol position. $k_0$ and $k_1$ are frequency-domain sub-carrier position parameters, and $l_0$ is a time-domain OFDM symbol position parameter. Since values of $k_i$ (i=0, 1) and $l_0$ are given by the first configuration information, position $(\bar{k}, \bar{l})$ of the above-mentioned CDM group is indicated by the first configuration information, and thus, a position of CSI-RS is indicated.

Case 4: a quantity of CSI-RS ports is 24 and a size of a CDM group of the K CDM groups is 2, K=12; positions of the K CDM groups are: $(k_0, l_0)$, $(k_1, l_0)$, $(k_2, l_0)$, $(k_0, l_0+1)$, $(k_1, l_0+1)$, $(k_2, l_0+1)$, $(k_0+12, l_0)$, $(k_1+12, l_0)$, $(k_2+12, l_0)$, $(k_0+12, l_0+1)$, $(k_1+12, l_0+1)$, $(k_2+12, l_0+1)$, respectively; or, $(k_0, l_0)$, $(k_1, l_0)$, $(k_2, l_0)$, $(k_0+12, l_0)$, $(k_1+12, l_0)$, $(k_2+12, l_0)$, $(k_0, l_0+1)$, $(k_1, l_0+1)$, $(k_2, l_0+1)$, $(k_0+12, l_0+1)$, $(k_1+12, l_0+1)$, $(k_2+12, l_0+1)$, respectively; corresponding CDM group indices are 0, 1, 2, 3, 4, 5, 6, 7, 8, 9, 10, 11, respectively. A first parameter in (,) represents a frequency-domain sub-carrier position of the CDM group, and a second parameter in (,) represents a time-domain OFDM symbol position. $k_0$, $k_1$ and $k_2$ are frequency-domain sub-carrier position parameters, and $l_0$ is a time-domain OFDM symbol position parameter. Since values of $k_i$ (i=0, 1, 2) and $l_0$ are given by the first configuration information, position $(\bar{k}, \bar{l})$ of the above-mentioned CDM group is indicated by the first configuration information, and thus, a position of the CSI-RS is indicated.

Case 5: a quantity of CSI-RS ports is 24 and a size of a CDM group of the K CDM groups is 4. K=6; positions of the K CDM groups are: $(k_0, l_0)$, $(k_1, l_0)$, $(k_2, l_0)$, $(k_0+12, l_0)$, $(k_1+12, l_0)$, $(k_2+12, l_0)$, respectively; corresponding CDM group indices are 0, 1, 2, 3, 4, 5, respectively. A first parameter in (,) represents a frequency-domain sub-carrier position of the CDM group, and a second parameter in (,) represents a time-domain OFDM symbol position. $k_0$, $k_1$ and $k_2$ are frequency-domain sub-carrier position parameters, and $l_0$ is a time-domain OFDM symbol position parameter. Since values of $k_i$ (i=0, 1, 2) and $l_0$ are given by the first configuration information, position $(\bar{k}, \bar{l})$ of the above-mentioned CDM group is indicated by the first configuration information, and thus, a position of CSI-RS is indicated.

Case 6: a quantity of CSI-RS ports is 24 and a size of a CDM group of the K CDM groups is 8. K=3; positions of the K CDM groups are: $(k_0, l_0)$, $(k_1, l_0)$, $(k_0+12, l_0)$, respectively; corresponding CDM group indices are 0, 1, 2, respectively. A first parameter in (,) indicates a frequency-domain sub-carrier position of the CDM group, and a second parameter in (,) represents a time-domain OFDM symbol position. $k_0$ and $k_1$ are frequency-domain sub-carrier position parameters, and $l_0$ is a time-domain OFDM symbol position parameter. Since values of $k_i$ (i=0, 1) and $l_0$ are given by the first configuration information, position $(\bar{k}, \bar{l})$ of the above-mentioned CDM group is indicated by the first configuration information, and thus, a position of CSI-RS is indicated.

Case 7: a quantity of CSI-RS ports is 16 and a size of a CDM group of the K CDM groups is 2, K=8; positions of the K CDM groups are: $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, respectively; corresponding CDM group indices are 0, 1, 2, 3, 4, 5, 6, 7, respectively. A first parameter in (,) represents a frequency-domain sub-carrier position of the CDM group, and a second parameter in (,) represents a time-domain OFDM symbol position. $k_0$, $k_1$, $k_2$ and $k_3$ are frequency-domain sub-carrier position parameters, and $l_0$ is a time-domain OFDM symbol position parameter. Since values of $k_i$ (i=0, 1, 2, 3) and $l_0$ are given by the first configuration information, position $(k, l)$ of the above-mentioned CDM group is indicated by the first configuration information, and thus, a position of CSI-RS is indicated.

Case 8: a quantity of CSI-RS ports is 16 and a size of a CDM group of the K CDM groups is 4, K=4; positions of the K CDM groups are: $(k_0, l_0)$, $(k_1, l_0)$, $(k_0+12, l_0)$, $(k_1+12, l_0)$, respectively; corresponding CDM group indices are 0, 1, 2, 3, respectively. A first parameter in (,) represents a frequency-domain sub-carrier position of the CDM group, and a second parameter in (,) represents a time-domain OFDM symbol position. $k_0$ and $k_1$ are frequency-domain sub-carrier position parameters, and $l_0$ is a time-domain OFDM symbol position parameter. Since values of $k_i$ (i=0, 1) and $l_0$ are given by the first configuration information, position $(\bar{k}, \bar{l})$ of the above-mentioned CDM group is indicated by the first configuration information, and thus, a position of CSI-RS is indicated.

In one slot, there are typically multiple CSI-RSs and multiple DM-RSs. If a number of time-domain orthogonal frequency division multiplexing (OFDM) symbols occupied by CSI-RS in one slot is large, it is susceptible to a collision with a DM-RS. In a new radio (NR) system, more time-domain OFDM symbols are occupied by CSI-RS. For example, a CSI-RS with 32 ports and CSI-RS with 24 ports are configured on 4 OFDM symbols, and a CSI-RS with 16 ports is configured on 2 OFDM symbols. In order to avoid a collision between the CSI-RS and the DM-RS, only the scheduling opportunity for CSI-RS and/or DM-RS is reduced. The above-mentioned eight candidate positions in this embodiment can halve a quantity of OFDM symbols occupied by the CSI-RS with 32 ports, CSI-RS with 24 ports, and CSI-RS with 16 ports. Even without reducing scheduling opportunities, the possibility of a collision between CSI-RS and DM-RS can be reduced. Since a position of the CDM group may be indicate by the first configuration information in the scenario of a CSI-RS with any quantity of ports, the flexibility for scheduling the CSI-RSs with different quantities of ports can be therefore increased.

In an embodiment, the channel state information reference signal resource includes K CDM groups, and K is a positive even number. In the K CDM groups, a position of a CDM group with index 0 is different from a position of a CDM group with index K/2 by Q frequency-domain resource blocks, and the CDM group with index 0 has a same time-domain OFDM symbol position as the CDM group with index K/2. The Q frequency-domain resource blocks contain M frequency-domain sub-carriers, where Q and M are positive integers. The first configuration information includes a frequency-domain sub-carrier position parameter and a time-domain OFDM symbol position parameter of the CDM group with index 0.

In this embodiment, the first configuration information indicates a time-frequency position $(k_0, l_0)$ of the CDM group with index 0. A position of the CDM group with index K/2 is different from a position of the CDM group with index 0 by Q frequency-domain resource blocks, and the CDM group with index K/2 has a same time-domain OFDM symbol position as the CDM group with index 0, that is, the CDM group with index K/2 and the CDM group with index 0 occupy different frequency-domain resource blocks, but halve the occupied time-domain OFDM symbols, where M is a quantity of frequency-domain sub-carriers included in Q resource blocks, K is a positive even number, and values of $k_0$ and $l_0$ are indicated by the first configuration information. In a case where all CDM groups crowded on the same resource block, there is a tendency to occupy more OFDM symbols; on the other hand, in a case where all CDM groups are distributed on different resource blocks, there is a tendency to occupy fewer OFDM symbols. In this embodiment, M is a quantity of frequency-domain sub-carriers included in Q resource blocks, a position of the CDM group with index K/2 is $(k_0+M, l_0)$ and a position of the CDM group with index 0 is $(k_0, l_0)$, thus a difference between $(k_0+M, l_0)$ and $(k_0, l_0)$ is Q resource blocks; that is, the CDM group with index K/2 and the CDM group with index 0 are placed on different resource blocks, which not only reduces the overhead of radio resources occupied by CSI-RS, but also bring a chance to save a quantity of occupied OFDM symbols in the time domain.

In an embodiment, the first configuration information includes two time-domain OFDM symbol position parameters of the channel state information reference signal resource. In a case where a difference between the two time-domain OFDM symbol position parameters is less than 2, a time-domain position of the channel state information reference signal resource is determined according to one of the two time-domain OFDM symbol position parameters. In a case where a difference between the two time-domain OFDM symbol position parameters is greater than or equal to 2, the time-domain position of the channel state information reference signal resource is determined according to the two time-domain OFDM symbol position parameters.

In this embodiment, the first configuration information indicates positions of the two time-domain OFDM symbols, which are represented by $l_0$ and $l_1$, respectively. On this basis, a position of CSI-RS is indicated according to a difference between $l_0$ and $l_1$. For example, in a case where the difference between $l_0$ and $l_1$ is large enough, available time-domain OFDM symbols are sufficient, and the possibility of a collision between CSI-RS and other signals is low, and thus there is no need to halve the time-domain OFDM symbols, but just adopts the CSI-RS resource configuration in the NR system. In a case where the difference between $l_0$ and $l_1$ is small, the above-mentioned eight candidate positions can be adopted to carry CSI-RS, so as to reduce the possibility of a collision.

Below, take cases of selecting a size of a CDM group for a CSI-RS with 32 ports, a CSI-RS with 24 ports, and a CSI-RS with 16 ports respectively as examples for description.

If $l_1-l_0<2$, the following positions can be indicated for the CSI-RS resources with different quantities of ports.

1) A quantity of CSI-RS ports is 32, a size of a CDM group is 4, K=8, and positions $(\bar{k}, \bar{l})$ of the K CDM groups are: $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, respectively. Since values of $k_i$ (i=0, 1, 2, 3) and $l_0$ are given by the first configuration information, positions $(\bar{k}, \bar{l})$ of the above-mentioned CDM group are indicated by the first configuration information, and thus, a position of CSI-RS is indicated (i.e., case 2 mentioned above).

2) A quantity of CSI-RS ports is 24, a size of a CDM group is 4, K=6, and positions $(\bar{k}, \bar{l})$ of the K CDM groups are: $(k_0, l_0)$, $(k_1, l_0)$, $(k_2, l_0)$, $(k_0+12, l_0)$, $(k_1+12, l_0)$, $(k_2+12, l_0)$, respectively. Since values of $k_i$ (i=0, 1, 2) and $l_0$ are given by the first configuration information, positions $(\bar{k}, \bar{l})$ of the above-mentioned CDM group are indicated by the first configuration information, and thus, a position of CSI-RS is indicated (i.e., case 5 mentioned above).

3) A quantity of CSI-RS ports is 16, a size of a CDM group is 4, K=4, and positions $(\bar{k}, \bar{l})$ of the K CDM groups are: $(k_0, l_0)$, $(k_1, l_0)$, $(k_0+12, l_0)$, $(k_1+12, l_0)$, respectively. Since values of $k_i$ (i=0, 1) and $l_0$ are given by the first configuration information, positions $(\bar{k}, \bar{l})$ of the above-mentioned CDM group are indicated by the first configuration information, and thus, a position of the CSI-RS is indicated (i.e., case 8 mentioned above).

If $l_1-l_0\geq2$, the following positions can be indicated for the CSI-RS resources with different quantities of ports:

1) a quantity of CSI-RS ports is 32, a size of a CDM group is 4, positions $(\bar{k}, \bar{l})$ of 8 CDM groups are: $(k_0, l_0)$, $(k_1, l_0)$, $(k_2, l_0)$, $(k_3, l_0)$, $(k_0, l_1)$, $(k_1, l_1)$, $(k_2, l_1)$, $(k_3, l_1)$, respectively. Since values of $k_i$ (i=0,1,2,3) and $l_j$ (j=0, 1) can be given by the first configuration information, positions $(\bar{k}, \bar{l})$ of the above-mentioned CDM group are indicated by the first configuration information, and thus, a position of CSI-RS is indicated;

2) a quantity of ports is 24, a size of a CDM group is 4, positions $(\bar{k}, \bar{l})$ of 6 CDM groups are: $(k_0, l_0)$, $(k_1, l_0)$, $(k_2, l_0)$, $(k_0, l_1)$, $(k_1, l_1)$, $(k_2, l_1)$. Since values of $k_i$ (i=0, 1, 2) and $l_j$ (j=0, 1) can be given by the first configuration information, positions $(\bar{k}, \bar{l})$ of the above-mentioned CDM groups are indicated by the first configuration information, and thus, a position of CSI-RS is indicated;

3) a quantity of ports is 16, a size of a CDM group is 4, positions $(\overline{k}, \overline{l})$ of 4 CDM groups are: $(k_0, l_0)$, $(k_1, l_0)$, $(k_0, l_1)$, $(k_1, l_1)$. Since values of $k_i$ (i=0, 1) and $l_j$ (j=0,1) can be given by the first configuration information, positions (k, l) of the above-mentioned CDM groups are indicated by the first configuration information, and thus, a position of CSI-RS is indicated.

In this embodiment, different CSI-RS candidate positions are indicated according to the difference between the two time-domain OFDM symbol position parameters. Since resources in different positions are adopted to carry CSI, thus guaranteeing the diversity of CSI-RS candidate positions, thereby improving the flexibility of CSI-RS scheduling.

In an embodiment, the CSI-RS resource includes T sets of CDM groups. The first configuration information includes a non-zero-power channel state information reference signal resource information element (NZP-CSI-RS-Resource IE), the non-zero-power channel state information reference signal resource information element includes T channel state information reference signal resource mapping information elements (CSI-RS-Resource Mapping IE), each of the channel state information reference signal resource mapping elements is used to indicate a position of a respective set of CDM groups.

In this embodiment, the position of the CSI-RS resource is a combination of positions of the T sets of CDM groups.

Taking T=2 as an example, the first channel state information reference signal resource mapping element indicates positions of the first set of CDM groups, and the first set of CDM groups includes $J_1$ CDM groups, where $J_1$ is an integer greater than or equal to 1; the second channel state information reference signal resource mapping element indicates positions of the second set of CDM groups, and the second set of CDM groups includes $J_2$ CDM groups, where $J_2$ is an integer greater than or equal to 1. In this case, positions of the CSI-RS resource include positions of $J_1+J_2$ CDM groups. A quantity of each set of CDM groups may be equal or unequal.

For another example, the first channel state information reference signal resource mapping element indicates positions of the first set of CDM groups, including positions of J CDM groups, where J is an integer greater than or equal to 1; the second channel state information reference signal resource mapping element indicates positions of the second set of CDM groups, including positions of J CDM groups; positions of the channel state information reference signal are positions of 2J CDM groups.

In an embodiment, the channel state information reporting method further includes the following steps.

Step 112: determining a number of a channel state information reference signal port according to an index of the CDM group: p=N+s+jK, where K represents a size of the CDM group, j represents an index of the CDM group, and s represents a code sequence index for code division multiplexing the channel state information reference signal of the channel state information reference signal port over a CDM group with index j. s is a non-negative integer less than K, and N is an initial number of the channel state information reference signal port and N is a non-negative integer. The first channel state information reference signal resource mapping element indicates positions of the first set of CDM groups, including positions of J: CDM groups, and indices of the Ji CDM groups are mapped to 0, 1, . . . , $J_1-1$; second channel state information reference signal resource mapping element indicates positions of the second set of CDM groups, including positions of $J_2$ CDM groups, and indices of the $J_2$ CDM groups are mapped to $J_1$, $J_1+1$, . . . , $J_1+J_2-1$; where j is a non-negative integer less than $J_1+J_2$.

In this embodiment, before CSI is reported, the terminal can determine the number of the CSI-RS port according to the index of the CDM group carrying the CSI and indicated by the first configuration information. The multiplexing mode of CSI-RS over the CDM ports is code division multiplexing.

Taking T=2 as an example, the first channel state information reference signal resource mapping element indicates positions of the first set of CDM groups, including positions of $J_1$ CDM groups, and indices of the $J_1$ CDM groups are mapped to 0, 1, . . . , $J_1-1$; the second channel state information reference signal resource mapping element indicates positions of the second set of CDM groups, including positions of $J_2$ CDM groups, and indices of the $J_2$ CDM groups are mapped to $J_1$, $J_1+1$, . . . , $J_1+J_2-1$. Positions of the channel state information reference signal are positions of CDM groups with index 0, 1, . . . , $J_1+J_2-1$.

A number of the CSI-RS port is determined according to the mapped CDM group indexs 0, 1, . . . , $J_1+J_2-1$: p=N+s+jK; where j is a mapped CDM group index, and j takes a value from 0, 1, . . . , $J_1+J_2-1$; K is a size of CDM group, s is a code sequence index for code division multiplexing the signal in the port with number p over a CDM group with index j, and s takes a value form 0, 1, . . . , K−1. Nis an initial number of the channel state information reference signal port, for example, N is 3000.

For another example, the first channel state information reference signal resource mapping element indicates positions of the first set of CDM groups, including positions of J CDM groups, and indices of the J CDM groups are mapped to 0, 1, . . . , J−1; the second channel state information reference signal resource mapping element indicates positions of the second set of CDM groups, including positions of J CDM groups, and indices of the J CDM groups are mapped to J, J+1, . . . , 2J−1. Positions of the channel state information reference signal are positions of CDM groups with index 0, 1, . . . , 2J−1.

A number of the CSI-RS port is determined according to the mapped CDM groups with indexes 0, 1, . . . , 2J−1: p=N+s+jK; where j is a mapped CDM group index, j takes a value from 0, 1, . . . , 2J−1; K is a size of a CDM group, s is a code sequence index for code division multiplexing the signal in the port with a number p over a CDM group with index j, and s takes a value form 0, 1, . . . , K−1. N is an initial number of the channel state information reference signal port, for example, N is 3000.

On this basis, the first set of CDM groups corresponds to $P_1$ CSI-RS ports, where $P_1$ is an integer greater than or equal to 1, and numbers of the $P_1$ CSI-RS ports are mapped to N, N+1, . . . , $N+P_1-1$; the second set of CDM groups corresponds to $P_2$ CSI-RS ports, where $P_2$ is an integer greater than or equal to 1, and numbers of the $P_2$ CSI-RS port are mapped to $N+P_1$, $N+P_1+1$, . . . , $N+P_1+P_2-1$.

In an embodiment, the channel state information reporting method further includes:

step 114: calculating a quantity of channel state information processing units occupied for receiving the CSI-RS according to the first configuration information, where the quantity of channel state information processing units occupied for receiving the CSI-RS is T.

In this embodiment, before CSI is reported, the terminal may calculate the quantity of the channel state information processing units occupied for receiving the CSI-RS according to the quantity of CDM groups, or the quantity of the channel state information reference signal resource mapping elements indicated by the first configuration information, where the quantity of channel state information processing units occupied for receiving the CSI-RS is T.

Receiving a CSI-RS and reporting of CSI by the terminal need to be within its own capabilities. By analyzing the terminal's workload for receiving CSI-RS, the required quantity of channel state information processing units is accurately calculated, thus the performance of receiving and reporting can be improved, and further, operational failure, crashes, and other issues are avoided. In this embodiment, the non-zero-power channel state information reference signal resource information element includes T channel state information reference signal resource mapping elements, then during the reception of CSI-RS on the terminal side, T channel state information processing units are allocated to receive the CSI-RS carried on the channel state information reference signal resource, so as to ensure the accuracy of the measurement of the CSI processing units occupied for receiving process, and further, avoid insufficient preparation or waste of the number of the channel state information processing units.

In an embodiment, CSI includes PMI, and a precoding matrix is determined according to a first group of vectors and a second group of vectors; where the first group of vectors includes L vectors, and the second group of vectors includes $M_v$ vectors; where L and $M_v$ are positive integers.

In this embodiment, the terminal reports the PMI to the base station to indicate the precoding matrix applied to an antenna of the base station. The terminal determines the precoding matrix according to the first group of vectors and the second group of vectors and indicates the precoding matrix to the base station through the PMI. After the PMI is received by the base station, the base station recovers the precoding matrix according to the first group of vectors and the second group of vectors. In this embodiment, the first group of vectors includes L vectors, and the second group of vectors includes $M_v$ vectors.

In this embodiment, the precoding matrix is W composed of $W_1$, $W_2$ and $W_f$, for example, $W=W_1 W_2 W_f^H$, where $W_1$ is a matrix composed of the L vectors, $W_f$ is a matrix composed of $M_v$ vectors, $W_f^H$ is a transposed-conjugate matrix of $W_f$, and $W_2$ is a matrix composed of coefficients of $LM_v$ vector pairs composed of the L vectors and the $M_v$ vectors.

In an embodiment, corresponding to $M_v$ being 2, the second group of vectors includes a DFT vector with index 0 and a DFT vector with index $n_3^{(f)}$; where an element in the DFT vector with index $n_3^{(f)}$ is represented as $$e^{\frac{2\pi t n_3^{(f)}}{N_3}},$$

where t is a non-negative integer less than $N_3$, and $N_3$ is a quantity of precoding matrices.

In this embodiment, t is an index of an element in the DFT vector, t takes a value from 0, 1, . . . , $N_3-1$, and t may also represent an index of the precoding matrix. The power of the precoding matrix is mainly concentrated on the DFT vector with index 0 and the DFT vector whose index is close to index 0 of the DFT vector (i.e., the DFT vector with index $n_3^{(f)}$.

In an embodiment, $n_3^{(f)}$ is determined in one of the following ways: selected, by the precoding indicator, from 1 and $N_3-1$; selected, by the second configuration information, from 1 and $N_3-1$; determined according to a quantity of precoding matrix subbands included in each channel quality indicator CQI subband.

In this embodiment, corresponding to $M_v$ being 2, there are three ways to determine $n_3^{(f)}$:

mode 1: the DFT vector with index $n_3^{(f)}$ can be the DFT vector either with index 1 or with index $N_3-1$, and thus, the terminal can select either 1 or $N_3-1$ as $n_3^{(f)}$ by the precoding indicator;

mode 2: the DFT vector with index $n_3^{(f)}$ can be the DFT vector either with index 1 or with index $N_3-1$, and thus, the base station can select either 1 or $N_3-1$ as $n_3^{(f)}$ by the second configuration information;

mode 3: value range of $n_3^{(f)}$ is determined according to R, where R represents a quantity of precoding matrix subbands included in each CQI subband. Part of the power of precoding is concentrated on the DFT vector with index 0, and another part of the power of precoding is mainly concentrated on the DFT vector with the index range determined by R. For example, $n_3^{(f)}$ takes a value from integers within an interval [−R, −1], or integers within an interval [$N_3-R,-1$] represented by positive indexes. For another example, $n_3^{(f)}$ takes a value from integers within an interval [1, R]. For another example, $n_3^{(f)}$ takes a value from integers within an interval [−R/2, R/2] other than 0. For another example, $n_3^{(f)}$ takes a value from the integers within a union of an interval [1, R/2] and an interval [$N_3-R/2$, $N_3-1$].

In an embodiment, $M_v$ being 1 indicates that a format of the channel quality indicator is a wideband channel quality indicator format.

In this embodiment, a format of channel quality indicator includes a wideband channel quality indicator format (the corresponding reporting format is wideband CQI reporting) and a subband channel quality indicator format (the corresponding reporting format is subband CQI reporting). Corresponding to $M_v$ being 1, the channel is typically relatively flat in the frequency domain, and thus, the overhead for reporting the channel quality indicator can be saved by adopting the wideband channel quality indicator format.

In an embodiment, the channel state information reporting method further includes:

step 122: determining $M_v$ according to at least one of P and L, where P is a quantity of CSI-RS ports.

In this embodiment, the precoding matrix may be determined according to the first group of vectors and the second group of vectors, the first group of vectors includes L vectors, where L is an integer greater than or equal to 1, and the second group of vectors includes $M_v$ vectors, where $M_v$ is an integer greater than or equal to 1. The terminal or base station may determine $M_v$ according to the quantity P of CSI-RS ports and/or L, where P and/or L may be taken as a reporting parameter of CSI and indicated by the second configuration information.

In an embodiment, $M_v$ meets at least one of:

corresponding to P being greater than or equal to a first threshold (that is, $P \geq Th_1$, where $Th_1$ is a first threshold, P is an integer greater than or equal to 1), $M_v$ is 2; corresponding to P being less than or equal to a second threshold (that is, $P \leq Th_2$, where $Th_2$ is a second threshold), $M_v$ is 2; corresponding to P belonging to a first interval or a first set (that is, P takes a value within the first interval $P \in [E1,E1']$, where E1<E1'; or $P \in U_1$, where $U_1$ is the first set, the first set contains a quantity of at least one specified port), $M_v$ is 2; corresponding to L being greater than or equal to a third threshold (that is, $L \geq Th_3$, where $Th_3$ is a third threshold), $M_v$ is 2;

corresponding to L being less than or equal to a fourth threshold (that is., $L \leq Th_4$, where $Th_4$ is a fourth threshold), $M_\nu$ is 2; corresponding to L belonging to a second interval or a second set (that is, L takes a value within a second interval $P \in [E2,E2']$, where $E2 < E2'$; or $P \in U2$, where $U_2$ is the second set, and the second set contains a quantity of at least one specified vector), $M_\nu$ is 2; corresponding to a ratio of L to P being greater than or equal to a fifth threshold (that is, $L/P \geq Th_5$, where $Th_5$ is the fifth threshold), $M_\nu$ is 2; corresponding to a ratio of L to P is less than or equal to a sixth threshold (that is, $L/P \leq Th_6$, where $Th_6$ is the sixth threshold), $M_\nu$ is 2; corresponding to the ratio of L to P belonging to a third interval or a third set (that is, L/P takes a value within the third interval $L/P \in [E3, E3']$, where $E3 < E3'$; or $P \in U_3$, where $U_3$ is the third set, and the third set contains at least one specified ratio), $M_\nu$ is 2; where P is a quantity of CSI-RS ports, and L is a quantity of DFT vectors included in the first group of vectors.

In an embodiment, the value of $M_\nu$ is determined according to the quantity R of the precoding matrix subbands included in each channel quality indicator CQI subband. In an embodiment, the value of $M_\nu$ is proportional to R. In another embodiment, the value of $M_\nu$ is the product of R and a coefficient. In yet another embodiment, the value of $M_\nu$ is equal to R.

In an embodiment, the channel state information reporting method further includes: step 124: determining L vectors based on the value of $M_\nu$, where L is an integer greater than or equal to 1.

In this embodiment, the first group of vectors includes L vectors, and a mapping relationship between the L vectors and the P CSI-RS ports is determined according to the value of $M_\nu$, where P is an integer greater than or equal to 1. In an embodiment, the mapping relationship between the CSI-RS ports and the L vectors meets: corresponding to $M_\nu > 1$, each of the CSI-RS ports corresponds to a respective vector, and corresponding to $M_\nu = 1$, each of the L ports among the CSI-RS ports corresponds to a respective vector; or corresponding to $M_\nu > 1$, each of the L ports among the CSI-RS ports corresponds to a respective vector, and corresponding to $M_\nu = 1$, each of the CSI-RS ports corresponds to a respective vector.

In this embodiment, corresponding to $M_\nu > 1$, P CSI-RS ports are mapped to L vectors, where each of the ports is mapped to a respective vector, L=P; corresponding to $M_\nu = 1$, L ports are selected from P ports, and the L ports are mapped to L vectors, where each of the ports is mapped to a respective vector.

Alternatively, corresponding to $M_\nu > 1$, L ports are selected from P ports, and the L ports are mapped to L vectors, where each of the ports is mapped to a respective vector; corresponding to $M_\nu = 1$, the P ports are mapped to L vectors, where each of the ports is mapped to a corresponding to vector, L=P.

In an embodiment, the PMI is used to indicate a non-zero coefficient in the coefficients of $LM_\nu$ vector pairs composed of $L+M_\nu$ vectors, where the maximum value of the quantities of non-zero coefficients in each layer is $K_0$, and $K_0$ is a positive integer.

In this embodiment, the precoding matrix may be determined according to the first group of vectors and the second group of vectors, the first group of vectors includes L vectors, where L is an integer greater than or equal to 1, the second group of vectors includes $M_\nu$ vectors, where $M_\nu$ is an integer greater than or equal to 1, and the first group of vectors and the second group of vectors can form $LM_\nu$ vectors pairs together, and the PMI is used to indicate the non-zero coefficient in the coefficients of the $LM_\nu$ vector pairs.

In an embodiment, P is a quantity of CSI-RS ports, where P is an integer greater than or equal to 1, and L is determined according to one of:
 L is determined according to P and a first coefficient (denoted as $\lambda$), the second configuration information includes the quantity P of CSI-RS ports and $\lambda$, where $\lambda$ is a positive number; and L is equal to P.

In an embodiment, P is a quantity of CSI-RS ports, where P is an integer greater than or equal to 1, and the maximum value $K_0$ of the quantities of non-zero coefficients in each layer is determined according to one of:
 $K_0$ is determined according to the product of L and a second coefficient (denoted as $\alpha$), $\alpha$ is a positive number, and the second configuration information includes $\alpha$; $K_0$ is determined according to the product of P and a third coefficient (denoted as $\gamma$), $\gamma$ is a positive number, the second configuration information includes $\gamma$; $K_0$ is determined according to P; $K_0$ is equal to L; $K_0$ is equal to P.

In an embodiment, P is a quantity of CSI-RS ports, where P is an integer greater than or equal to 1, the second configuration information includes a combination parameter $\eta$, and the combination parameter $\eta$ is used to indicate one of:
 $\eta$ is used to indicate L and $\alpha$, $\alpha$ is a positive number, and in this case, $K_0$ is determined according to the product of L and $\alpha$; $\eta$ is used to indicate P and $\gamma$, $\gamma$ is a positive number, and in this case, $K_0$ is determined according to the product of P and $\gamma$; $\eta$ is used to indicate P, $\lambda$ and $\alpha$, $\lambda$ is a positive number, $\alpha$ is a positive number, L is determined according to P and $\lambda$, and $K_0$ is determined according to the product of L and $\lambda$.

In this embodiment, P, $\lambda$, $\alpha$, and/or $\gamma$ are contents indicated by the combination parameter $\eta$, and one or more of these parameters may be indicated as reporting parameters by the second configuration information.

In an embodiment, the channel state information reporting method further includes: step 126: determining a content indicated by the combination parameter according to $M_\nu$.

In this embodiment, P, $\lambda$, $\alpha$ and/or $\gamma$ are contents indicated by the combination parameter $\eta$, and the contents indicated by the combination parameter $\eta$ can be determined according to the value of $M_\nu$.

In an embodiment, corresponding to $M_\nu = 1$, the combination parameter is used to indicate P, $\lambda$ and $\alpha$, and corresponding to $M_\nu > 1$, the combination parameter is used to indicate P and $\gamma$; or, corresponding to $M_\nu = 1$, the combination parameter is used to indicate L and $\alpha$, and corresponding to $M_\nu > 1$, the combination parameter is used to indicate P and $\gamma$; or, corresponding to $M_\nu = 1$, the combination parameter is used to indicate P and $\gamma$, and for $M_\nu > 1$, the combination parameter is used to indicate P, $\lambda$ and $\alpha$; or, corresponding to $M_\nu = 1$, the combination parameter is used to indicate P and $\gamma$, and corresponding to $M_\nu > 1$, the combination parameter is used to indicate L and $\alpha$.

In an embodiment, the maximum value $K_0$ of the quantities of non-zero coefficients in each layer is determined according to $M_\nu$; $K_0$ corresponding to $M_\nu > 1$ is twice of the value of $K_0$ corresponding to $M_\nu = 1$.

For example, for $M_\nu = 1$, $K_0 = a$, where a is the maximum value of the quantities of non-zero coefficients in each layer, then for $M_\nu > 1$, $K_0 = 2a$.

In an embodiment, the channel state information reporting method further includes: step 140: reporting at least one of the following capabilities or any combination thereof according to the combination value of $M_v$ and R: a maximum quantity of ports of each CSI-RS resource; a maximum quantity of CSI-RS resources in each frequency band; a total quantity of ports of CSI-RS resources of each frequency band. R represents a quantity of precoding matrix subbands included in each CQI subband.

Receiving a CSI-RS and reporting CSI by the terminal need be within its own capabilities. The scheduling task for the terminal from the base station should not exceed the terminal's capabilities either. In this embodiment, in addition to reporting CSI, the terminal also accurately reports one or more of its own capabilities, so as to ensure stable performance of CSI-RS scheduling and transmission.

In an embodiment, the combination value of $M_v$ and R include at least one of the following combinations: $M_v$ is 1, R is 1; $M_v$ is 2, R is 1; $M_v$ is 1, R is 2; $M_v$ is 2, R is 2; $M_v$ is greater than 1, R is 1; $M_v$ is greater than 1, R is 2.

In this embodiment, the terminal may report at least one capability according to one or more combination values of $M_v$ and R. For example, for three cases: where $M_v$ is 1 and R is 1, $M_v$ is 2 and R is 1, and $M_v$ is 1 and R is 2, a maximum quantity of ports of each CSI-RS resource, a maximum quantity of CSI-RS resources of each frequency band and the like are reported by the terminal for each respective case. By the terminal reports one or more of the above-mentioned capabilities according to the combination values of $M_v$ and R, and thus, the accuracy and comprehensiveness of the capabilities for reporting are improved.

In the embodiments of the present disclosure, a channel state information receiving method is further provided, and the method can be applied to a base station on the network side. The terminal reports CSI to the base station by adopting the channel state information reporting methods in the above embodiments, and the base station recovers an applicable precoding matrix according to the CSI. For technical details not described in detail in these embodiments, reference may be made to any of the above-mentioned embodiments.

FIG. 2 is a flowchart of a channel state information receiving method provided by an embodiment. As shown in FIG. 2, the method provided by this embodiment includes step 210 to step 230.

In step 210, configuration information is sent, where the configuration information includes first configuration information and second configuration information, the first configuration information is used to indicate a position of a CSI-RS resource, and the second configuration information is used to indicate a reporting parameter of CSI.

In step 220, a CSI-RS is sent according to the first configuration information.

In step 230, the CSI is received according to the second configuration information.

In this embodiment, the first configuration information is used to indicate the position of the CSI-RS resource, for example, the CSI-RS resource includes multiple CDM groups, and the first configuration information is used to indicate multiple CDM groups, a CDM group with index 0, or, a frequency-domain sub-carrier position and a time-domain OFDM symbol position of each CDM group. The second configuration information is used to indicate a reporting parameter of CSI. For example, in a case where the terminal reports PMI to the base station, the second configuration information includes a parameter related to a DFT vector corresponding to the precoding matrix, such as a quantity of CSI-RS ports, and an index of a DFT vector corresponding to the precoding matrix and/or a parameter of the DFT vector group corresponding to the precoding matrix, etc.

The base station indicates the terminal to receive CSI-RS on the corresponding CSI-RS resource by sending the first configuration information, and the base station indicates the terminal to report CSI to the base station so as to acquire the channel state by sending the second configuration information, thus improving the flexibility of CSI-RS scheduling and transmission is improved, and further causing the CSI reporting process more flexible and reliable.

In an embodiment, the CSI-RS resource includes K CDM groups, K is a positive integer; the first configuration information includes a frequency-domain sub-carrier position parameter and a time-domain OFDM symbol position parameter of a CDM group.

In an embodiment, in a case where a quantity of CSI-RS ports is 32 and a size of a CDM group of the K CDM groups is 2, K=16; positions of the K CDM groups are $(k_0, l_0)$, $(k_1, l_0)$, $(k_2, l_0)$, $(k_3, l_0)$, $(k_0, l_0+1)$, $(k_1, l_0+1)$, $(k_2, l_0+1)$, $(k_3, l_0+1)$, $(k_0+12, l_0)$, $(k_1+12, l_0)$, $(k_2+12, l_0)$, $(k_3+12, l_0)$, $(k_0+12, l_0+1)$, $(k_1+12, l_0+1)$, $(k_2+12, l_0+1)$, $(k_3+12, l_0+1)$, respectively: corresponding CDM group indices are 0, 1, 2, 3, 4, 5, 6, 7, 8, 9, 10, 11, 12, 13, 14, 15, respectively; or, positions are $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, $(k_0, l_0+1)$, $(k_1, l_0+1)$, $(k_2, l_0+1)$, $(k_3, l_0+1)$, $(k_0+12, l_0+1)$, $(k_1+12, l_0+1)$, $(k_2+12, l_0+1)$, $(k_3+12, l_0+1)$, respectively, corresponding CDM group indices are 0, 1, 2, 3, 4, 5, 6, 7, 8, 9, 10, 11, 12, 13, 14, 15, respectively. A first parameter in (,) represents a frequency-domain sub-carrier position of a CDM group, and a second parameter in (,) represents a time-domain OFDM symbol position. $k_0$, $k_1$, $k_2$ and $k_3$ are frequency-domain sub-carrier position parameters, and $l_0$ is a time-domain OFDM symbol position parameter.

In an embodiment, in a case where a quantity of CSI-RS ports is 32 and a size of a CDM group of the K CDM groups is 4, K=8; positions of the K CDM groups are: $(k_0, l_0)$; $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, respectively; corresponding CDM group indices are 0, 1, 2, 3, 4, 5, 6, 7, respectively. A first parameter in (,) represents a frequency-domain sub-carrier position of a CDM group, and a second parameter in (,) represents a time-domain OFDM symbol position. $k_0$, $k_1$, $k_2$ and $k_3$ are frequency-domain sub-carrier position parameters, and $l_0$ is a time-domain OFDM symbol position parameter.

In an embodiment, in a case where a quantity of CSI-RS ports is 32 and a size of a CDM group of the K CDM groups is 8, K=4; positions of the K CDM groups are: $(k_0, l_0)$, $(k_1, l_0)$, $(k_0+12, l_0)$, $(k_1+12, l_0)$, respectively; corresponding CDM group indices are 0, 1, 2, 3, respectively. A first parameter in (,) represents a frequency-domain sub-carrier position of a CDM group, and a second parameter in (,) represents a time-domain OFDM symbol position. $k_0$ and $k_1$ are frequency-domain sub-carrier position parameters, and $l_0$ is a time-domain OFDM symbol position parameter.

In an embodiment, in a case where a quantity of CSI-RS ports is 24 and a size of a CDM group of the K CDM groups is 2, K=12; positions of the K CDM groups are: $(k_0, l_0)$, $(k_1, l_0)$, $(k_2, l_0)$, $(k_0, l_0+1)$, $(k_1, l_0+1)$, $(k_2, l_0+1)$, $(k_0+12, l_0)$, $(k_1+12, l_0)$, $(k_2+12, l_0)$, $(k_0+12, l_0+1)$, $(k_1+12, l_0+1)$, $(k_2+12, l_0+1)$; or, $(k_0, l_0)$, $(k_1, l_0)$, $(k_2, l_0)$, $(k_0+12, l_0)$, $(k_1+12, l_0)$, $(k_2+12, l_0)$, $(k_0, l_0+1)$, $(k_1, l_0+1)$, $(k_2, l_0+1)$, $(k_0+12, l_0+1)$, $(k_1+12, l_0+1)$, $(k_2+12, l_0+1)$, respectively; corresponding CDM group indices are 0, 1, 2, 3, 4, 5, 6, 7, 8, 9, 10, 11, respectively. A first parameter in (,) represents a frequency-domain sub-carrier position of a CDM group, and a second parameter in (,) represents a time-domain OFDM symbol position. $k_0$, $k_1$ and $k_2$ are frequency-domain sub-carrier position parameters, and $l_0$ is a time-domain OFDM symbol position parameter.

In an embodiment, in a case where a quantity of CSI-RS ports is 24 and a size of a CDM group of the K CDM groups is 4, K=6; positions of the K CDM groups are: $(k_0, l_0)$, $(k_1, l_0)$, $(k_2, l_0)$, $(k_0+12, l_0)$, $(k_1+12, l_0)$, $(k_2+12, l_0)$, respectively; corresponding CDM group indices are 0, 1, 2, 3, 4, 5, respectively. A first parameter in (,) represents a frequency-domain sub-carrier position of a CDM group, and a second parameter in (,) represents a time-domain OFDM symbol position. $k_0$, $k_1$ and $k_2$ are frequency-domain sub-carrier position parameters, and lo is a time-domain OFDM symbol position parameter.

In an embodiment, in a case where a quantity of CSI-RS ports is 24 and a size of a CDM group of the K CDM groups is 8, K=3; positions of the K CDM groups are: $(k_0, l_0)$, $(k_1, l_0)$, $(k_0+12, l_0)$, respectively; corresponding CDM group indices are 0, 1, 2, respectively. A first parameter in (,) indicates a frequency-domain sub-carrier position of a CDM group, and a second parameter in (,) represents a time-domain OFDM symbol position. $k_0$ and $k_1$ are frequency-domain sub-carrier position parameters, and $l_0$ is a time-domain OFDM symbol position parameter.

In an embodiment, in a case where a quantity of CSI-RS ports is 16 and a size of a CDM group of the K CDM groups is 2, K=8; positions of the K CDM groups are: $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, respectively; corresponding CDM group indices are 0, 1, 2, 3, 4, 5, 6, 7, respectively. A first parameter in (,) represents a frequency-domain sub-carrier position of a CDM group, and a second parameter in (,) represents a time-domain OFDM symbol position. $k_0$, $k_1$, $k_2$ and $k_3$ are frequency-domain sub-carrier position parameters, and $l_0$ is a time-domain OFDM symbol position parameter.

In an embodiment, in a case where a quantity of CSI-RS ports is 16 and a size of a CDM group of the K CDM groups is 4, K=4; positions of the K CDM groups are: $(k_0, l_0)$, $(k_1, l_0)$, $(k_0+12, l_0)$, $(k_1+12, l_0)$, respectively; corresponding CDM group indices are 0, 1, 2, 3, respectively. A first parameter in (,) represents a frequency-domain sub-carrier position of a CDM group, and a second parameter in (,) represents a time-domain OFDM symbol position. $k_0$ and $k_1$ are frequency-domain sub-carrier position parameters, and $l_0$ is a time-domain OFDM symbol position parameter.

In an embodiment, the CSI-RS resource includes K CDM groups, and K is a positive even number. In the K CDM groups, a position of a CDM group with index 0 is different from a position of a CDM group with index K/2 by Q frequency-domain resource blocks, and the CDM group with index 0 has a same time-domain OFDM symbol position as the CDM group with index K/2. The Q frequency-domain resource blocks contain M frequency-domain sub-carriers, where Q and M are positive integers. The first configuration information includes a frequency-domain sub-carrier position parameter and a time-domain OFDM symbol position parameter of the CDM group with index 0.

In an embodiment, the first configuration information includes two time-domain OFDM symbol position parameters of the CSI-RS resource. In a case where a difference between the two time-domain OFDM symbol position parameters is less than 2, a time-domain position of the CSI-RS resource is determined according to one of the two time-domain OFDM symbol position parameters. In a case where a difference between the two time-domain OFDM symbol position parameters is greater than or equal to 2, a time-domain position of the CSI-RS resource is determined according to the two time-domain OFDM symbol position parameters.

In an embodiment, the CSI-RS resource includes T sets of CDM groups. The first configuration information includes a non-zero-power channel state information reference signal resource information element, the non-zero-power channel state information reference signal resource information element includes T channel state information reference signal resource mapping elements, each of the channel state information reference signal resource mapping elements is used to indicate a position of a respective set of CDM groups.

In an embodiment, a number of the CSI-RS port is determined according to the index of the CDM group: $p=N+s+jK$, where K represents a size of CDM group, j represents an index of the CDM group, and s represents a code sequence index for code division multiplexing the CSI-RS of the CSI-RS port over the CDM group with index j. s is a non-negative integer less than K, and N is an initial number of the CSI-RS port and N is a non-negative integer. The first CSI-RS resource mapping element indicates positions of the first set of the CDM groups, including positions of $J_1$ CDM groups, and indices of the $J_1$ CDM groups are mapped to 0, 1, . . . , $J_1-1$; the second CSI-RS resource mapping element indicates positions of the second set of CDM groups, including positions of $J_2$ CDM groups, and indices of the $J_2$ CDM groups are mapped to $J_1$, $J_1+1$, . . . , $J_1+J_2-1$; where j is a non-negative integer less than $J_1+J_2$.

In an embodiment, a quantity of channel state information processing units occupied for receiving CSI-RS is the same as a quantity of CSI-RS resource mapping elements in the first configuration information.

In an embodiment, CSI includes a precoding matrix indicator PMI; the channel state information receiving method further includes:

step 240: determining a precoding matrix according to the first group of vectors and the second group of vectors; where the first group of vectors includes L vectors, and the second group of vectors includes $M_v$ vectors, where L and $M_v$ are positive integers.

In an embodiment, corresponding to $M_v$ being 2, the second group of vectors includes a DFT vector with index 0 and a DFT vector with index $n_3^{(f)}$; an element in the DFT vector with index $n_3^{(f)}$ is represented as $$e^{\frac{2\pi t n_3^{(f)}}{N_3}},$$

where t is a non-negative integer less than $N_3$, and $N_3$ is a quantity of precoding matrices.

In an embodiment, $n_3^{(f)}$ is determined in one of the following ways: selected, by the precoding indicator, from 1 and $N_3-1$; selected, by the second configuration information, from 1 and $N_3-1$; determined based on the quantity of precoding matrix subbands included in each channel quality indicator CQI subband.

In an embodiment, $M_v$ being 1 indicates that a format of the channel quality indicator is a wideband channel quality indicator format.

In an embodiment, the channel state information receiving method further includes: step 212: determining $M_v$ according to at least one of P and L, where P is a quantity of CSI-RS ports.

In an embodiment, $M_v$ meets at least one of:

corresponding to P being greater than or equal to a first threshold, $M_v$ is 2; corresponding to P being less than or equal to a second threshold, $M_v$ is 2; corresponding to P belonging to a first interval or a first set, $M_v$ is 2; corresponding to L being greater than or equal to a third threshold, $M_v$ is 2; corresponding to L being less than or equal to a fourth threshold, $M_v$ is 2; corresponding to L belonging to a second interval or a second set, $M_v$ is 2; corresponding to the ratio of L to P being greater than or equal to a fifth threshold, $M_v$ is 2; corresponding to the ratio of L to P being less than or equal to a sixth threshold, $M_v$ is 2; corresponding to the ratio of L to P belonging to a third interval or a third set, $M_v$ is 2; where P is a quantity of CSI-RS ports.

In an embodiment, the channel state information receiving method further includes: step 214: determining L vectors according to the value of $M_v$, where L is an integer greater than or equal to 1.

In an embodiment, a mapping relationship between the CSI-RS ports and the L vectors (where L is an integer greater than or equal to 1) meets: corresponding to $M_v>1$, each of the CSI-RS ports corresponds to a respective vector, and corresponding to $M_v=1$, each of the L ports among the CSI-RS ports corresponds to a respective vector; or, corresponding to $M_v>1$, each of the L ports among the CSI-RS ports corresponds to a respective vector, and corresponding to $M_v=1$, each of the CSI-RS ports corresponds to a respective vector.

In an embodiment, PMI is used to indicate a non-zero coefficient in the coefficients of $LM_v$ vector pairs composed of $L+M_v$ vectors, where L and $M_v$ are integers greater than or equal to 1, where the maximum value of the quantities of non-zero coefficients in each layer is $K_0$, and $K_0$ is a positive integer.

In an embodiment, L is determined according to one of:

the second configuration information includes P and a first coefficient, the first coefficient is a positive number, and L is determined according to P and the first coefficient; L is equal to P; where P is a quantity of CSI-RS ports and P is an integer greater than or equal to 1.

In an embodiment, $K_0$ is determined according to one of:

$K_0$ is determined according to the product of L and a second coefficient, the second coefficient is a positive number, and the second configuration information includes the second coefficient; $K_0$ is determined according to the product of P and a third coefficient, the third coefficient is a positive number, and the second configuration information includes the third coefficient; $K_0$ is determined according to P; $K_0$ is equal to L; $K_0$ is equal to P; where P is a quantity of CSI-RS ports, and P is an integer greater than or equal 1.

In an embodiment, the second configuration information includes a combination parameter, and the combination parameter is used to indicate one of:

the combination parameter is used to indicate L and a second coefficient, the second coefficient is a positive number, and $K_0$ is determined according to the product of L and the second coefficient; the combination parameter is used to indicate P and a third coefficient, the third coefficient is a positive number, and $K_0$ is determined according to the product of P and the third coefficient; the combination parameter is used to indicate P, a first coefficient and a second coefficient, the first coefficient is a positive number, the second coefficient is a positive number, L is determined according to P and the first coefficient, $K_0$ is determined according to the product of L and the second coefficient; where P is a quantity of CSI-RS ports.

In an embodiment, the channel state information receiving method further includes: step 216: determining a content indicated by the combination parameter according to $M_v$.

In an embodiment, corresponding to $M_v=1$, the combination parameter is used to indicate P, the first coefficient and the second coefficient, and corresponding to $M_v>1$, the combination parameter is used to indicate P and the third coefficient; or, corresponding to $M_v=1$, the combination parameter is used to indicate L and the second coefficient, and corresponding to $M_v>1$, the combination parameter is used to indicate P and the third coefficient; or, corresponding to $M_v=1$, the combination parameter is used to indicate P and the third coefficient, and corresponding to $M_v>1$, the combination parameter is used to indicate P, the first coefficient and the second coefficient; or, corresponding to $M_v=1$, the combination parameter is used to indicate P and the third coefficient, and corresponding to $M_v>1$, the combination parameter is used to indicate L and the second coefficient.

In an embodiment, $K_0$ is determined according to $M_v$; $K_0$ corresponding to $M_v>1$ is twice of the value of $K_0$ corresponding to $M_v=1$.

In an embodiment, the channel state information receiving method further includes:

step 250: receiving at least one of the following capabilities or any combination thereof according to the combination value of $M_v$ and R: a maximum quantity of ports of each CSI-RS resource; a maximum quantity of CSI-RS resources in each frequency band; a total quantity of ports of CSI-RS resources in each frequency band; where R represents a quantity of precoding matrix subbands included in each CQI subband.

In an embodiment, the combination value of $M_v$ and R includes at least one of the combinations: $M_v$ is 1, R is 1; $M_v$ is 2, R is 1; $M_v$ is 1, R is 2; $M_v$ is 2, R is 2; $M_v$ is greater than 1, R is 1; and $M_v$ is greater than 1, R is 2.

The embodiments of the present disclosure further provide a channel state information reporting device. FIG. 3 is a schematic structural diagram of a channel state information reporting device provided by an embodiment. As shown in FIG. 3, the channel state information reporting device includes:

a configuration information receiving module 310, configured to receive configuration information, the configuration information includes first configuration information and second configuration information, the first configuration information is used to indicate a position of a CSI-RS resource, and the second configuration information is used to indicate a reporting parameter of CSI; a reference signal receiving module 320, configured to receive a CSI-RS according to the first configuration information; and a reporting module 330, configured to report the CSI according to the second configuration information and a measurement of the CSI-RS.

The channel state information reporting device in this embodiment receives the CSI-RS on the corresponding CSI-RS resource according to an indication of the first configuration information, and reports the CSI according to an indication of the second configuration information so as to feed back the channel state, thus improving the flexibility of CSI-RS scheduling and transmission, and causing the CSI reporting process more flexible and reliable.

In an embodiment, the CSI-RS resource includes K CDM groups, K is a positive integer; the first configuration information includes a frequency-domain sub-carrier position parameter and a time-domain OFDM symbol position parameter of the CDM group.

In an embodiment, in a case where a quantity of CSI-RS ports is 32 and a size of a CDM group of the K CDM groups is 2, K=16; positions of the K CDM groups are $(k_0, l_0)$, $(k_1, l_0)$, $(k_2, l_0)$, $(k_3, l_0)$, $(k_0, l_0+1)$, $(k_1, l_0+1)$, $(k_2, l_0+1)$, $(k_3, l_0+1)$, $(k_0+12, l_0)$, $(k_1+12, l_0)$, $(k_2+12, l_0)$, $(k_3+12, l_0)$, $(k_0+12, l_0+1)$, $(k_1+12, l_0+1)$, $(k_2+12, l_0+1)$, $(k_3+12, l_0+1)$, respectively: corresponding CDM group indices are 0, 1, 2, 3, 4, 5, 6, 7, 8, 9, 10, 11, 12, 13, 14, 15, respectively; or, positions of the K CDM groups are $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, $(k_0, l_0+1)$, $(k_1, l_0+1)$, $(k_2, l_0+1)$, $(k_3, l_0+1)$, $(k_0+12, l_0+1)$, $(k_1+12, l_0+1)$, $(k_2+12, l_0+1)$, $(k_3+12, l_0+1)$, respectively, corresponding CDM group indices are 0, 1, 2, 3, 4, 5, 6, 7, 8, 9, 10, 11, 12, 13, 14, 15, respectively. A first parameter in (,) represents a frequency-domain sub-carrier position of the CDM group, and a second parameter in (,) represents a time-domain OFDM symbol position. $k_0$, $k_1$, $k_2$ and $k_3$ are frequency-domain sub-carrier position parameters, and $l_0$ is a time-domain OFDM symbol position parameter.

In an embodiment, in a case where a quantity of CSI-RS ports is 32 and a size of a CDM group of the K CDM groups is 4, K=8; positions of the K CDM groups are: $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, respectively; corresponding CDM group indices are 0, 1, 2, 3, 4, 5, 6, 7, respectively. A first parameter in (,) represents a frequency-domain sub-carrier position of the CDM group, and a second parameter in (,) represents a time-domain OFDM symbol position. $k_0$, $k_1$, $k_2$ and $k_3$ are frequency-domain sub-carrier position parameters, and $l_0$ is a time-domain OFDM symbol position parameter.

In an embodiment, in a case where a quantity of CSI-RS ports is 32 and a size of a CDM group of the K CDM groups is 8, K=4; positions of the K CDM groups are: $(k_0, l_0)$, $(k_1, l_0)$, $(k_0+12, l_0)$, $(k_1+12, l_0)$, respectively; corresponding CDM group indices are 0, 1, 2, 3, respectively. A first parameter in (,) represents a frequency-domain sub-carrier position of the CDM group, and a second parameter in (,) represents a time-domain OFDM symbol position. $k_0$ and $k_1$ are frequency-domain sub-carrier position parameters, and $l_0$ is a time-domain OFDM symbol position parameter.

In an embodiment, in a case where a quantity of CSI-RS ports is 24 and a size of a CDM group of the K CDM groups is 2, K=12; positions of the K CDM groups are: $(k_0, l_0)$, $(k_1, l_0)$, $(k_2, l_0)$, $(k_0, l_0+1)$, $(k_1, l_0+1)$, $(k_2, l_0+1)$, $(k_0+12, l_0)$, $(k_1+12, l_0)$, $(k_2+12, l_0)$, $(k_0+12, l_0+1)$, $(k_1+12, l_0+1)$, $(k_2+12, l_0+1)$; or, $(k_0, l_0)$, $(k_1, l_0)$, $(k_2, l_0)$, $(k_0+12, l_0)$, $(k_1+12, l_0)$, $(k_2+12, l_0)$, $(k_0, l_0+1)$, $(k_1, l_0+1)$, $(k_2, l_0+1)$, $(k_0+12, l_0+1)$, $(k_1+12, l_0+1)$, $(k_2+12, l_0+1)$, respectively; corresponding CDM group indices are 0, 1, 2, 3, 4, 5, 6, 7, 8, 9, 10, 11, respectively. A first parameter in (,) represents a frequency-domain sub-carrier position of the CDM group, and a second parameter in (,) represents a time-domain OFDM symbol position. $k_0$, $k_1$ and $k_2$ are frequency-domain sub-carrier position parameters, and $l_0$ is a time-domain OFDM symbol position parameter.

In an embodiment, in a case where a quantity of CSI-RS ports is 24 and a size of a CDM group of the K CDM groups is 4, K=6; positions of the K CDM groups are: $(k_0, l_0)$, $(k_1, l_0)$, $(k_2, l_0)$, $(k_0+12, l_0)$, $(k_1+12, l_0)$, $(k_2+12, l_0)$, respectively; corresponding CDM group indices are 0, 1, 2, 3, 4, 5, respectively. A first parameter in (,) represents a frequency-domain sub-carrier position of the CDM group, and a second parameter in (,) represents a time-domain OFDM symbol position. $k_0$, $k_1$ and $k_2$ are frequency-domain sub-carrier position parameters, and $l_0$ is a time-domain OFDM symbol position parameter.

In an embodiment, in a case where a quantity of CSI-RS ports is 24 and a size of a CDM group of the K CDM groups is 8, K=3; positions of the K CDM groups are: $(k_0, l_0)$, $(k_1, l_0)$, $(k_0+12, l_0)$, respectively; corresponding CDM group indices are 0, 1, 2, respectively. A first parameter in (,) indicates a frequency-domain sub-carrier position of the CDM group, and a second parameter in (,) represents a time-domain OFDM symbol position; $k_0$ and $k_1$ are frequency-domain sub-carrier position parameters, and $l_0$ is a time-domain OFDM symbol position parameter.

In an embodiment, in a case where a quantity of CSI-RS ports is 16 and a size of a CDM group of the K CDM groups is 2, K=8; positions of the K CDM groups are: $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, respectively; corresponding CDM group indices are 0, 1, 2, 3, 4, 5, 6, 7, respectively. A first parameter in (,) represents a frequency-domain sub-carrier position of the CDM group, and a second parameter in (,) represents a time-domain OFDM symbol position. $k_0$, $k_1$, $k_2$ and $k_3$ are frequency-domain sub-carrier position parameters, and $l_0$ is a time-domain OFDM symbol position parameter.

In an embodiment, in a case where the quantity of CSI-RS ports is 16 and a size of a CDM group of the K CDM groups is 4, K=4; positions of the K CDM groups are: $(k_0, l_0)$, $(k_1, l_0)$, $(k_0+12, l_0)$, $(k_1+12, l_0)$, respectively; corresponding CDM group indices are 0, 1, 2, 3, respectively. A first parameter in (,) represents a frequency-domain sub-carrier position of the CDM group, and a second parameter in (,) represents a time-domain OFDM symbol position. $k_0$ and $k_1$ are frequency-domain sub-carrier position parameters, and $l_0$ is a time-domain OFDM symbol position parameter.

In an embodiment, the CSI-RS resource includes K CDM groups, and K is a positive even number. In the K CDM groups, a position of the CDM group with index 0 is different from a position of the CDM group with index K/2 by Q frequency-domain resource blocks, and the CDM group with index 0 has a same time-domain OFDM symbol position as the CDM group with index K/2. The Q frequency-domain resource blocks contain M frequency-domain sub-carriers, where Q and M are positive integers. The first configuration information includes a frequency-domain sub-carrier position parameter and a time-domain OFDM symbol position parameter of the CDM group with index 0.

In an embodiment, the first configuration information includes two time-domain OFDM symbol position parameters of the CSI-RS. In a case where a difference between the two time-domain OFDM symbol position parameters is less than 2, a time-domain position of the CSI-RS resource is determined according to one of the two time-domain OFDM symbol position parameters. In a case where a difference between the two time-domain OFDM symbol position parameters is greater than or equal to 2, a time-domain position of the channel state information reference signal resource is determined according to the two time-domain OFDM symbol position parameters.

In an embodiment, the CSI-RS resource includes T sets of CDM groups, where T is an integer greater than or equal to 1. The first configuration information includes a non-zero-power channel state information reference signal resource information element, the non-zero-power channel state information reference signal resource information element includes T channel state information reference signal resource mapping elements, each of the channel state information reference signal resource mapping elements is used to indicate a position of a respective set of CDM groups.

In an embodiment, the channel state information reporting device further includes: a port number determining module, configured to determine a number of the CSI-RS according to an index of the CDM group: $p=N+s+jK$, where K represents a size of CDM group, j represents the index of the CDM group, and s represents a code sequence index for code division multiplexing the CSI-RS of the CSI-RS port over the CDM group with index j. s is a non-negative integer less than K, and N is an initial number of the CSI-RS port and N is a non-negative integer. The first CSI-RS resource mapping element indicates a position of the first set of CDM groups, including positions of Ji CDM groups, and indices of the $J_1$ CDM groups are mapped to 0, 1, . . . , $J_1-1$; the second CSI-RS resource mapping element indicates a position of the second set of CDM groups, including positions of $J_2$ CDM groups, and indices of the $J_2$ CDM groups are mapped to $J_1, J_1+1, . . . , J_1+J_2-1$; where j is a non-negative integer less than $J_1+J_2$.

In an embodiment, the channel state information reporting device further includes: a calculating module, configured to calculate a quantity of the channel state information processing units occupied for receiving the CSI-RS according to the first configuration information; where a quantity of channel state information processing units occupied for receiving the CSI-RS is T, where Tis an integer greater than or equal to 1.

In an embodiment, the channel state information includes PMI, and the precoding matrix is determined according to a first group of vectors and a second group of vectors; where the first group of vectors includes L vectors, the second group of vectors includes $M_v$ vectors, where L and $M_v$ are positive integers.

In an embodiment, corresponding to $M_v$ being 2, the second group of vectors includes a DFT vector with index 0 and a DFT vector with index $n_3^{(f)}$; an element in the DFT vector with index $n_3^{(f)}$ is represented as $$e^{\frac{2\pi t n_3^{(f)}}{N_3}},$$

where t is a non-negative integer less than $N_3$, and $N_3$ is a quantity of precoding matrices.

In an embodiment, $n_3^{(f)}$ is determined in one of the following ways: selected, by the precoding indicator, from 1 and $N_3-1$; selected, by the second configuration information, from 1 and $N_3-1$; determined according to a quantity of precoding matrix subbands included in each channel quality indicator CQI subband.

In an embodiment, $M_v$ being 1 indicates that a format of the channel quality indicator is a wideband channel quality indicator format.

In an embodiment, the channel state information reporting device further includes: a vector quantity determining module, configured to determine $M_v$ according to at least one of P and L, where P is a quantity of CSI-RS ports.

In an embodiment, $M_v$ meets at least one of:
corresponding to P being greater than or equal to a first threshold, $M_v$ is 2; corresponding to P is less than or equal to a second threshold, $M_v$ is 2; corresponding to P belonging to a first interval or a first set, $M_v$ is 2; corresponding to L being greater than or equal to a third threshold, $M_v$ is 2; corresponding to L being less than or equal to a fourth threshold, $M_v$ is 2; corresponding to L belonging to a second interval or a second set, $M_v$ is 2; corresponding to the ratio of L to P being greater than or equal to a fifth threshold, $M_v$ is 2; corresponding to the ratio of L to P being less than or equal to a sixth threshold, $M_v$ is 2; corresponding to the ratio of L to P belonging to a third interval or a third set, $M_v$ is 2; where P is a quantity of CSI-RS ports.

In an embodiment, the channel state information receiving device further includes: a vector determining module, configured to determine L vectors according to the value of $M_v$, where L is an integer greater than or equal to 1.

In an embodiment, a mapping relationship between the CSI-RS ports and the L vectors meets: corresponding to $M_v>1$, each of the CSI-RS ports corresponds to a respective vector, and corresponding to $M_v=1$, each of the L ports among the CSI-RS ports corresponds to a respective vector; or, corresponding to $M_v>1$, each of the L ports among the CSI-RS ports corresponds to a respective vector, and corresponding to $M_v=1$, each of the CSI-RS ports corresponds to a respective vector.

In an embodiment, the PMI is used to indicate a non-zero coefficient in the coefficients of $LM_v$ vector pairs composed of $L+M_v$ vectors, where L and $M_v$ are integers greater than or equal to 1, where a maximum value of a quantity of non-zero coefficients in each layer is $K_0$, and $K_0$ is a positive integer.

In an embodiment, L is determined based on one of:
the second configuration information includes P and a first coefficient, the first coefficient is a positive number, and L is determined according to P and the first coefficient; L is equal to P; where P is a quantity of CSI-RS ports.

In an embodiment, $K_0$ is determined according to one of:
$K_0$ is determined according to the product of L and a second coefficient, the second coefficient is a positive number, and the second configuration information includes the second coefficient; $K_0$ is determined according to the product of P and a third coefficient, the third coefficient is a positive number, and the second configuration information includes the third coefficient; $K_0$ is determined according to P; $K_0$ is equal to L; $K_0$ is equal to P; where P is a quantity of CSI-RS ports.

In an embodiment, the second configuration information includes a combination parameter, and the combination parameter is used to indicate one of:
the combination parameter is used to indicate L and a second coefficient, the second coefficient is a positive number, and $K_0$ is determined according to the product of L and the second coefficient; the combination parameter is used to indicate P and a third coefficient, the third coefficient is a positive number, and $K_0$ is determined according to the product of P and the third coefficient; the combination parameter is used to indicate P, a first coefficient and a second coefficient, the first coefficient is a positive number, the second coefficient is a positive number, L is determined according to P and the first coefficient, $K_0$ is determined according to the product of L and the second coefficient; where P is a quantity of CSI-RS ports.

In an embodiment, the channel state information reporting device further includes: an indication content determining module, configured to determine a content indicated by the combination parameter according to $M_v$.

In an embodiment, corresponding to $M_v=1$, the combination parameter is used to indicate P, a first coefficient and a second coefficient, and corresponding to $M_v>1$, the combination parameter is used to indicate P and the a coefficient; or, corresponding to $M_v=1$, the combination parameter is used to indicate L and a second coefficient, and corresponding to $M_v > 1$, the combination parameter is used to indicate P and a third coefficient; or, corresponding to $M_v = 1$, the combination parameter is used to indicate P and a third coefficient, and corresponding to $M_v > 1$, the combination parameter is used to indicate P, a first coefficient and a second coefficient; or, corresponding to $M_v = 1$, the combination parameter is used to indicate P and a third coefficient, and corresponding to $M_v > 1$, the combination parameter is used to indicate L and a second coefficient.

In an embodiment, $K_0$ is determined according to $M_v$; $K_0$ corresponding to $M_v > 1$ is twice of the value of $K_0$ corresponding to $M_v = 1$.

In an embodiment, the channel state information reporting device further includes: a capability reporting module, configured to report at least one of the following capabilities or any combination thereof according to the combination value of $M_v$ and R: a maximum quantity of ports of each CSI-RS resource; a maximum quantity of CSI-RS resources in each frequency band; a total quantity of ports of CSI-RS resources in each frequency band; where R represents a quantity of precoding matrix subbands included in each CQI subband.

In an embodiment, the combination values of $M_v$ and R include at least one of the combinations: $M_v$ is 1, R is 1; $M_v$ is 2, R is 1; $M_v$ is 1, R is 2; $M_v$ is 2, R is 2; $M_v$ is greater than 1, R is 1; $M_v$ is greater than 1, R is 2.

The channel state information reporting device proposed in these embodiments and the channel state information reporting methods proposed in the above-mentioned embodiments belong to the same concept. For technical details not described in detail in these embodiments, reference may be made to any of the above-mentioned embodiments, and this embodiment has the same effect as that for executing the channel state information reporting method.

Figure 4:
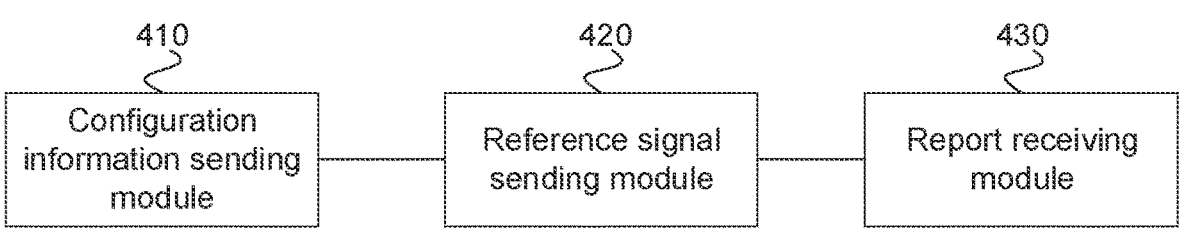
FIG. 4 is a schematic structural diagram of a channel state information receiving device provided by an embodiment.

The embodiments of the present disclosure further provide a channel state information receiving device. FIG. 4 is a schematic structural diagram of a channel state information receiving device provided by an embodiment. As shown in FIG. 4, the channel state information receiving device includes:

a configuration information sending module 410, configured to send configuration information, where the configuration information includes first configuration information and second configuration information, the first configuration information is used to indicate a position of a CSI-RS resource, and the second configuration information is used to indicate a reporting parameter; a reference signal sending module 420, configured to send a CSI-RS according to the first configuration information; and a report receiving module 430, configured to receive channel state information according to the second configuration information.

The channel state information reporting device in this embodiment indicates the terminal to receive a CSI-RS on the corresponding CSI-RS resource by sending the first configuration information, and indicates the terminal to report the CSI to the base station by sending the second configuration information so as to acquire the channel state, thus improving the flexibility of CSI-RS scheduling and transmission, and causing the CSI reporting process more flexible and reliable.

In an embodiment, the CSI-RS resource includes K CDM groups, K is a positive integer; the first configuration information includes a frequency-domain sub-carrier position parameter and a time-domain OFDM symbol position parameter of the CDM group.

In an embodiment, in a case where a quantity of CSI-RS ports is 32 and a size of CDM group of the K CDM groups is 2, K=16; positions of the K CDM groups are $(k_0, l_0)$, $(k_1, l_0)$, $(k_2, l_0)$, $(k_3, l_0)$, $(k_0, l_0+1)$, $(k_1, l_0+1)$, $(k_2, l_0+1)$, $(k_3, l_0+1)$, $(k_0+12, l_0)$, $(k_1+12, l_0)$, $(k_2+12, l_0)$, $(k_3+12, l_0)$, $(k_0+12, l_0+1)$, $(k_1+12, l_0+1)$, $(k_2+12, l_0+1)$, $(k_3+12, l_0+1)$, respectively; corresponding CDM group indices are 0, 1, 2, 3, 4, 5, 6, 7, 8, 9, 10, 11, 12, 13, 14, 15, respectively; or, positions are $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, $(k_0, l_0+1)$, $(k_1, l_0+1)$, $(k_2, l_0+1)$, $(k_3, l_0+1)$, $(k_0+12, l_0+1)$, $(k_1+12, l_0+1)$, $(k_2+12, l_0+1)$, $(k_3+12, l_0+1)$, respectively, the corresponding CDM group indices are 0, 1, 2, 3, 4, 5, 6, 7, 8, 9, 10, 11, 12, 13, 14, 15, respectively. A first parameter in (,) represents a frequency-domain sub-carrier position of the CDM group, and a second parameter in (,) represents a time-domain OFDM symbol position. $k_0$, $k_1$, $k_2$ and $k_3$ are frequency-domain sub-carrier position parameters, and $l_0$ is a time-domain OFDM symbol position parameter.

In an embodiment, in a case where a quantity of CSI-RS ports is 32 and a size of a CDM group of the K CDM groups is 4, K=8; positions of the K CDM groups are: $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, respectively; corresponding CDM group indices are 0, 1, 2, 3, 4, 5, 6, 7, respectively. A first parameter in (,) represents a frequency-domain sub-carrier position of the CDM group, and a second parameter in (,) represents a time-domain OFDM symbol position. $k_0$, $k_1$, $k_2$ and $k_3$ are frequency-domain sub-carrier position parameters, and $l_0$ is a time-domain OFDM symbol position parameter.

In an embodiment, in a case where a quantity of CSI-RS ports is 32 and a size of a CDM group of the K CDM groups is 8, K=4; positions of the K CDM groups are: $(k_0, l_0)$, $(k_1, l_0)$, $(k_0+12, l_0)$, $(k_1+12, l_0)$, respectively; corresponding CDM group indices are 0, 1, 2, 3, respectively. A first parameter in (,) represents a frequency-domain sub-carrier position of the CDM group, and a second parameter in (,) represents a time-domain OFDM symbol position. $k_0$ and $k_1$ are frequency-domain sub-carrier position parameters, and $l_0$ is a time-domain OFDM symbol position parameter.

In an embodiment, in a case where a quantity of CSI-RS ports is 24 and a size of a CDM group of the K CDM groups is 2, K=12; positions of the K CDM groups are: $(k_0, l_0)$, $(k_1, l_0)$, $(k_2, l_0)$, $(k_0, l_0+1)$, $(k_1, l_0+1)$, $(k_2, l_0+1)$, $(k_0+12, l_0)$, $(k_1+12, l_0)$, $(k_2+12, l_0)$, $(k_0+12, l_0+1)$, $(k_1+12, l_0+1)$, $(k_2+12, l_0+1)$, respectively; or, $(k_0, l_0)$, $(k_1, l_0)$, $(k_2, l_0)$, $(k_0+12, l_0)$, $(k_1+12, l_0)$, $(k_2+12, l_0)$, $(k_0, l_0+1)$, $(k_1, l_0+1)$, $(k_2, l_0+1)$, $(k_0+12, l_0+1)$, $(k_1+12, l_0+1)$, $(k_2+12, l_0+1)$, respectively; corresponding CDM group indices are 0, 1, 2, 3, 4, 5, 6, 7, 8, 9, 10, 11, respectively. A first parameter in (,) represents a frequency-domain sub-carrier position of the CDM group, and a second parameter in (,) represents a time-domain OFDM symbol position. $k_0$, $k_1$ and $k_2$ are frequency-domain sub-carrier position parameters, and $l_0$ is a time-domain OFDM symbol position parameter.

In an embodiment, in a case where a quantity of CSI-RS ports is 24 and a size of a CDM group of the K CDM groups is 4, K=6; the positions of the K CDM groups are: $(k_0, l_0)$, $(k_1, l_0)$, $(k_2, l_0)$, $(k_0+12, l_0)$, $(k_1+12, l_0)$, $(k_2+12, l_0)$, respectively; corresponding CDM group indices are 0, 1, 2, 3, 4, 5, respectively. A first parameter in (,) represents a frequency-domain sub-carrier position of the CDM group, and a second parameter in (,) represents a time-domain OFDM symbol position. $k_0$, $k_1$ and $k_2$ are frequency-domain sub-carrier position parameters, and $l_0$ is a time-domain OFDM symbol position parameter.

In an embodiment, in a case where a quantity of CSI-RS ports is 24 and a size of a CDM group of the K CDM groups is 8, K=3; positions of the K CDM groups are: $(k_0, l_0)$, $(k_1, l_0)$, $(k_0+12, l_0)$, respectively; corresponding CDM group indices are 0, 1, 2, respectively. A first parameter in (,) indicates a frequency-domain sub-carrier position of the CDM group, and a second parameter in (,) represents a time-domain OFDM symbol position. $k_0$ and $k_1$ are frequency-domain sub-carrier position parameters, and $l_0$ is a time-domain OFDM symbol position parameter.

In an embodiment, in a case where a quantity of CSI-RS ports is 16 and a size of a CDM group of the K CDM groups is 2, K=8; positions of the K CDM groups are: $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, respectively; corresponding CDM group indices are 0, 1, 2, 3, 4, 5, 6, 7, respectively. A first parameter in (,) represents a frequency-domain sub-carrier position of the CDM group, a second parameter in (,) represents a time-domain OFDM symbol position. $k_0$, $k_1$, $k_2$ and $k_3$ are frequency-domain sub-carrier position parameters, and $l_0$ is a time-domain OFDM symbol position parameter.

In an embodiment, in a case where a quantity of CSI-RS ports is 16 and a size of a CDM group of the K CDM groups is 4, K=4; positions of the K CDM groups are: $(k_0, l_0)$, $(k_1, l_0)$, $(k_0+12, l_0)$, $(k_1+12, l_0)$, respectively; corresponding CDM group indices are 0, 1, 2, 3, respectively. A first parameter in (,) represents a frequency-domain sub-carrier position of the CDM group, and a second parameter in (,) represents a time-domain OFDM symbol position. $k_0$ and $k_1$ are frequency-domain sub-carrier position parameters, and $l_0$ is a time-domain OFDM symbol position parameter.

In an embodiment, the CSI-RS resource includes K CDM groups, and K is a positive even number. In the K CDM groups, a position of the CDM group with index 0 is different from the position of the CDM group with index K/2 by Q frequency-domain resource blocks, and the CDM group with index 0 has a same time-domain OFDM symbol position as the CDM group with index K/2. The Q frequency-domain resource blocks contain M frequency-domain sub-carriers, where Q and M are positive integers. The first configuration information includes a frequency-domain sub-carrier position parameter and a time-domain orthogonal frequency division multiplexing (OFDM) symbol position parameter of the CDM group with index 0.

In an embodiment, the first configuration information includes two time-domain OFDM symbol position parameters of the CSI-RS resource. In a case where a difference between the two time-domain OFDM symbol position parameters is less than 2, a time-domain position of the CSI-RS resource is determined according to one of the two time-domain OFDM symbol position parameters. In a case where a difference between the two time-domain OFDM symbol position parameters is greater than or equal to 2, a time-domain position of the CSI-RS resource is determined according to the two time-domain OFDM symbol position parameters.

In an embodiment, the CSI-RS resource includes T sets of CDM groups. The first configuration information includes a non-zero-power channel state information reference signal resource information element, the non-zero-power channel state information reference signal resource information element includes T channel state information reference signal resource mapping elements, each of the channel state information reference signal resource mapping elements is used to indicate a position of a respective set of CDM groups.

In an embodiment, the channel state information receiving device further includes: a number determining module, configured to determine a number of the CSI-RS port according to an index of the CDM group: $p=N+s+jK$, where K represents a size of the CDM group, j represents the index of the CDM group, and s represents a code sequence index for code division multiplexing the CSI-RS of the CSI-RS port over the CDM group with index j. s is a non-negative integer less than K, and Nis an initial number of the CSI-RS port and N is a non-negative integer. The first CSI-RS resource mapping element indicates positions of the first set of CDM groups, including positions of $J_1$ CDM groups, and indices of the $J_1$ CDM groups are mapped to $0, 1, \ldots, J_1-1$; the second CSI-RS resource mapping element indicates positions of the second set of CDM groups, including positions of $J_2$ CDM groups, and indices of the $J_2$ CDM groups are mapped to $J_1, J_1+1, \ldots, J_1+J_2-1$; where j is a non-negative integer less than $J_1+J_2$.

In an embodiment, a quantity of channel state information processing units occupied for receiving CSI-RS is the same as a quantity of CSI-RS resource mapping elements in the first configuration information.

In an embodiment, the channel state information includes a precoding matrix indicator PMI; the channel state information receiving device further includes: a precoding matrix determining module, configured to determine a precoding matrix according to the first group of vectors and the second group of vectors; where the first group of vectors includes L vectors, and the second group of vectors includes $M_v$ vectors, where L and $M_v$ are positive integers.

In an embodiment, corresponding to $M_v$ being 2, the second group of vectors includes a DFT vector with index 0 and a DFT vector with index $n_3^{(f)}$; an element in the DFT vector with index $n_3^{(f)}$ is represented as $$e^{\frac{2\pi t n_3^{(f)}}{N_3}},$$

where t is a non-negative integer less than $N_3$, and $N_3$ is a quantity of precoding matrices.

In an embodiment, $n_3^{(f)}$ is determined in one of the following ways: selected, by the precoding indicator, from 1 and $N_3-1$; selected, by the second configuration information, from 1 and $N_3-1$; determined according to a quantity of precoding matrix subbands included in each channel quality indicator CQI subband.

In an embodiment, $M_v$ being 1 indicates that a format of the channel quality indicator is a wideband channel quality indicator format.

In an embodiment, the channel state information receiving device further includes: a quantity determining module, configured to determine $M_v$ according to at least one of P and L, where P is a quantity of CSI-RS ports.

In an embodiment, $M_v$ meets at least one of:
corresponding to P being greater than or equal to a first threshold, $M_v$ is 2; corresponding to P being less than or equal to a second threshold, $M_v$ is 2; corresponding to P belonging to a first interval or a first set, $M_v$ is 2; corresponding to L being greater than or equal to a third threshold, $M_v$ is 2; corresponding to L being less than or equal to a fourth threshold, $M_v$ is 2; corresponding to L belonging to a second interval or a second set, $M_v$ is 2; corresponding to the ratio of L to P being greater than or equal to a fifth threshold, $M_v$ is 2; corresponding to the ratio of L to P being less than or equal to a sixth threshold, $M_v$ is 2; corresponding to the ratio of L to P belonging to a third interval or a third set, $M_v$ is 2; where P is a quantity of CSI-RS ports.

In an embodiment, the channel state information receiving device further includes: a vector determining module, configured to determine L vectors according to the value of $M_v$, where L is an integer greater than or equal to 1.

In an embodiment, a mapping relationship between the CSI-RS ports and the L vectors (where L is an integer greater than or equal to 1) meets: corresponding to $M_v>1$, each of the CSI-RS ports corresponds to a respective vector, and corresponding to $M_v=1$, each of the L ports among the CSI-RS ports corresponds to a respective vector; or, corresponding to $M_v>1$, each of the L ports among the CSI-RS ports corresponds to a respective vector, and corresponding to $M_v=1$, each of the CSI-RS ports corresponds to a respective vector.

In an embodiment, the PMI is used to indicate a non-zero coefficient in the coefficients of $LM_v$ vector pairs composed of $L+M_v$ vectors, where L and $M_v$ are integers greater than or equal to 1, where a maximum value of the quantity of non-zero coefficients in each layer is K, and $K_0$ is a positive integer.

In an embodiment, L is determined according to one of: the second configuration information includes P and a first coefficient, the first coefficient is a positive number, and L is determined according to P and the first coefficient; L is equal to P; where P is a quantity of CSI-RS ports.

In an embodiment, $K_0$ is determined according to one of: $K_0$ is determined according to the product of L and a second coefficient, the second coefficient is a positive number, and the second configuration information includes the second coefficient; $K_0$ is determined according to the product of P and a third coefficient, the third coefficient is a positive number, and the second configuration information includes the third coefficient; $K_0$ is determined according to P; $K_0$ is equal to L; $K_0$ is equal to P; where P is a quantity of CSI-RS ports.

In an embodiment, the second configuration information includes a combination parameter, and the combination parameter is used to indicate one of: the combination parameter is used to indicate L and a second coefficient, the second coefficient is a positive number, and $K_0$ is determined according to the product of L and the second coefficient; the combination parameter is used to indicate P and a third coefficient, the third coefficient is a positive number, and $K_0$ is determined according to the product of P and the third coefficient; the combination parameter is used to indicate P, a first coefficient and a second coefficient, the first coefficient is a positive number, the second coefficient is a positive number, L is determined according to P and the first coefficient, $K_0$ is determined according to the product of L and the second coefficient; where, P is a quantity of CSI-RS ports.

In an embodiment, the channel state information receiving device further includes: a content determining module, configured to determine a content indicated by the combination parameter according to $M_v$.

In an embodiment, corresponding to $M_v=1$, the combination parameter is used to indicate P, a first coefficient and a second coefficient, and corresponding to $M_v>1$, the combination parameter is used to indicate P and a third coefficient; or, corresponding to $M_v=1$, the combination parameter is used to indicate L and a second coefficient, and corresponding to $M_v>1$, the combination parameter is used to indicate P and a third coefficient; or, corresponding to $M_v=1$, the combination parameter is used to indicate P and a third coefficient, and corresponding to $M_v>1$, the combination parameter is used to indicate P, a first coefficient and a second coefficient; or, corresponding to $M_v=1$, the combination parameter is used to indicate P and a third coefficient, and corresponding to $M_v>1$, the combination parameter is used to indicate L and a second coefficient.

In an embodiment, $K_0$ is determined according to $M_v$; $K_0$ corresponding to $M_v>1$ is twice of the value of $K_0$ corresponding to $M_v=1$.

In an embodiment, the channel state information receiving device further includes: a capability receiving module, configured to receive at least one of the following capabilities or any combination thereof according to the combination value of $M_v$ and R:

a maximum quantity of ports of each CSI-RS resource; a maximum quantity of CSI-RS resources in each frequency band; a total quantity of ports of CSI-RS resources in each frequency band; where R represents a quantity of precoding matrix subbands included in each CQI subband.

In an embodiment, the combination value of $M_v$ and R includes at least one of the combinations: $M_v$ is 1, R is 1; $M_v$ is 2, R is 1; $M_v$ is 1, R is 2; $M_v$ is 2, R is 2; $M_v$ is greater than 1, R is 1; $M_v$ is greater than 1, R is 2.

The channel state information receiving device proposed in these embodiments and the channel state information receiving methods proposed in the above-mentioned embodiments belong to the same concept. For technical details not described in detail in these embodiments, reference may be made to any of the above-mentioned embodiments, and this embodiment has the same effect as that for executing the channel state information receiving method.

Figure 5:
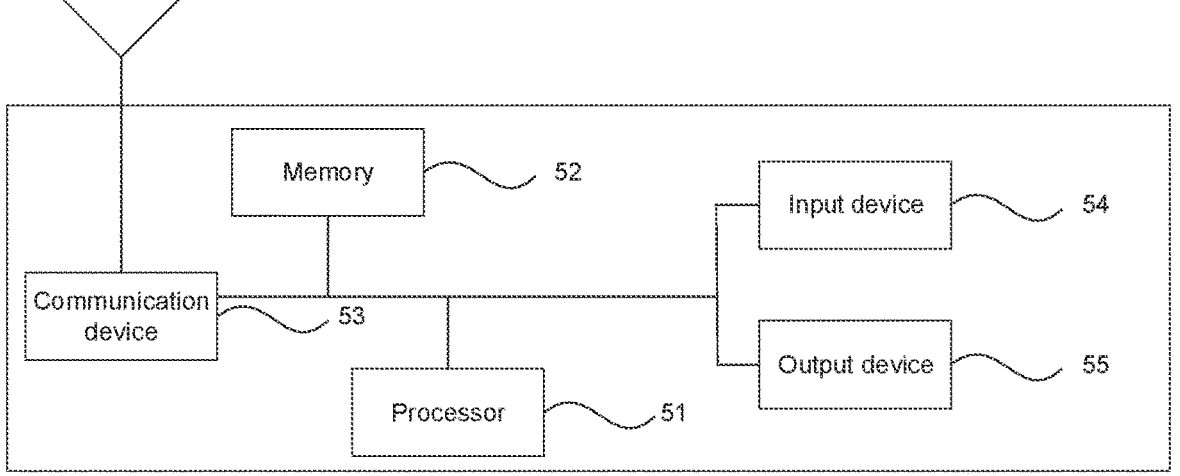
FIG. 5 is a schematic diagram of a hardware structure of a communication node provided by an embodiment.

The embodiments of the present disclosure further provide a communication node. FIG. 5 is a schematic diagram of a hardware structure of a communication node provided by an embodiment. As shown in FIG. 5, the communication node provided by the present disclosure includes a memory 52, a processor 51 and a computer program stored in the memory and runnable on the processor, in response that the processor 51 executes the program, any one of the above-mentioned channel state information reporting methods or the channel state information receiving methods is implemented. For example, the communication node may be a user terminal (UE), receives CSI-RS according to a resource position indicated by a first configuration information, and reports channel state information to a base station according to an indication of the second configuration information. Alternatively, the communication node may be a base station, indicates a resource position of CSI-RS through first configuration information, and receives channel state information reported by a user terminal according to an indication of second configuration information.

There may be one or more processors 51 in the communication node. In FIG. 5, take one processor 51 as an example. The memory 52 is used to store one or more programs. In response that the one or more program are executed by the one or more processors 51, the one or more processors 51 implement the channel state information reporting method or the channel state information receiving method as described in any one of the embodiments of the present disclosure.

The communication node further includes: a communication device 53, an input device 54 and an output device 55.

The processor 51, the memory 52, the communication device 53, the input device 54 and the output device 55 in the communication node may be connected via a bus or in other ways. In FIG. 5, take the connection via a bus as an example.

The input device 54 may be used to receive inputted numeric or character information, and generate a key signal input related to a user setting and a functional control of the communication node. The output device 55 may include a display device such as a display screen.

The communication device 53 may include a receiver and a transmitter. The communication device 53 is configured to receive and transmit information under the control of the processor 51.

The memory 52, as a computer readable storage medium, may be configured to store software programs, computer executable programs and modules, such as program instructions/modules corresponding to the channel state information reporting method described in the embodiments of the present disclosure (for example, the configuration information receiving module 310, the reference signal receiving module 320 and the reporting module 330 in the channel state information reporting device). The memory 52 may include a program storing area and a data storing area, where the program storing area may store an operating system, an application program required by at least one function, the data storing area may store data created according to the usage of the communication node, and the like. In addition, the memory 52 may include a high-speed random access memory, and may further include a nonvolatile memory, e.g., at least a disk memory means, a flash means, or other nonvolatile solid memory means. In some examples, the memory 52 may include memories that are remotely disposed relative to the processor 51, and these remote memories may be connected to the communication node via a network. Examples of the above-mentioned networks include but are not limited to an Internet, an intranet, a local area network, a mobile communication network and a combination thereof.

The embodiments of the present disclosure further provide a storage medium, the storage medium stores a computer program, and in response that the computer program is executed by a processor, the channel state information reporting method or the channel state information receiving method described in any of the embodiments of the present disclosure is implemented.

The channel state information reporting method includes: receiving configuration information, the configuration information includes first configuration information and second configuration information, the first configuration information is used to indicate a position of a channel state information reference signal resource, and the second configuration information is used to indicate a reporting parameter of channel state information; receiving a CSI-RS according to the first configuration information; reporting the channel state information according to the second configuration information and a measurement of the CSI-RS.

The channel state information receiving method includes: sending configuration information, the configuration information includes first configuration information and second configuration information, the first configuration information is used to indicate a position of a CSI-RS resource, and the second configuration information is used to indicate a reporting parameter of CSI; sending a CSI-RS according to the first configuration information; receiving the channel state information according to the second configuration information.

The computer storage medium in the embodiments of the present disclosure may adopt any combination of one or more computer readable media. The computer readable medium may be a computer readable signal medium or a computer readable storage medium. A computer readable storage medium may be, for example, but not limited to: an electrical, magnetic, optical, electromagnetic, infrared, or semiconductor system, apparatus, or means, or any combination thereof. Examples (non-exhaustive list) of the computer readable storage medium include: electrical connections with one or more conductors, portable computer disks, hard disks, random access memories (RAM), read only memories (ROM), erasable programmable read only memories (EPROM), flash memories, optical fiber, portable disc read-only memories (CD-ROM), optical storage means, magnetic storage means or any suitable combination of the above. A computer readable storage medium may be any tangible medium that contains or stores a program that may be used by or in connection with an instruction execution system, apparatus, or means.

A computer readable signal medium may include a data signal propagating in baseband or as part of a carrier wave, where the data signal carries computer readable program code. The data signal may be transmitted in many forms, including, but not limited to: a radio signal, an optical signal, or any suitable combination thereof. A computer readable signal medium may also be any computer readable medium other than a computer readable storage medium, which can send, propagate, or transmit a program that may be used by or in connection with an instruction execution system, an apparatus, or a means.

A program code in the computer readable medium may be transmitted with any suitable medium, including but not limited to: a radio, an electric wire, an optical cable, a radio frequency (Radio Frequency, RF) or the like, or any suitable combination thereof.

A computer program code for performing operations of the present disclosure may be written in one or more programming languages or combinations thereof. The programming languages include object-oriented programming languages such as Java, Smalltalk, C++, and conventional procedural programming languages, such as the "C" language or similar programming language. The program code may be executed entirely on the user's computer, partly on the user's computer, as a stand-alone software package, partly on the user's computer and partly on a remote computer, or entirely on a remote computer or server. In a case involving a remote computer, the remote computer may be connected to the user's computer through any kind of network, including a local area network (LAN) or a wide area network (WAN), or may be connected to an external computer (for example, a connect through an internet provided by an internet service provider).

The above descriptions are merely exemplary embodiments of the present disclosure.

Those skilled in the art will understand that the term "user terminal" covers any suitable type of wireless user equipment, such as a mobile phone, a portable data processing apparatus, a portable web browser or a vehicle-mounted mobile station.

In general, various embodiments of the present disclosure can be implemented in hardware or special purpose circuits, software, logic or any combination thereof. For example, some aspects may be implemented in hardware, while other aspects may be implemented in firmware or software executable by a controller, a microprocessor or other computing apparatuses, although the present disclosure is not limited thereto.

The embodiments of the present disclosure may be implemented by executing computer program instructions through a data processor of a mobile apparatus, for example in a processor entity, or by hardware, or by a combination of software and hardware. Computer program instructions may be assembly instructions, instruction set architecture (ISA) instructions, machine instructions, machine-dependent instructions, microcode, firmware instructions, state setting data, or source codes or object codes written in any combination of one or more programming languages.

Any block diagram of a logic flow in the drawings of the present disclosure may represent program steps, or may represent interconnected logic circuits, modules and functions, or may represent a combination of program steps and logic circuits, modules and functions. The computer program may be stored in a memory. The memory may be of any type suitable for the local technical environment and may be implemented using any suitable data storage technology, such as but not limited to read only memory (ROM), random access memory (RAM), optical storage apparatuses and systems (digital video disc (DVD) or compact disks (CD)), and the like. Computer readable medium may include non-transitory storage medium. Data processors can be of any type suitable for the local technical environment, such as but not limited to general purpose computers, special purpose computers, microprocessors, digital signal processors (DSP), application specific integrated circuits (ASIC), programmable logic means (FPGA), and processors based on multi-core processor architectures.

What is claimed is:

1. A channel state information reporting method, comprising:

receiving configuration information, the configuration information comprises first configuration information and second configuration information, the first configuration information is used to indicate a position of a channel state information reference signal resource, and the second configuration information is used to indicate a reporting parameter of channel state information;

receiving a channel state information reference signal according to the first configuration information; and reporting the channel state information according to the second configuration information and a measurement of the channel state information reference signal;

wherein the channel state information comprises a precoding matrix indicator (PMI) which is used to indicate a precoding matrix, the precoding matrix is determined according to a first group of vectors and a second group of vectors;

wherein the first group of vectors comprises L vectors, the second group of vectors comprises My vectors, and L and My are positive integers; L is determined according to one of:

the second configuration information comprises P and a first coefficient, the first coefficient is a positive number, and L is determined according to P and the first coefficient; and L is equal to P;

wherein P is a quantity of channel state information reference signal ports.

2. The method according to claim 1, wherein the channel state information reference signal resource comprises K code division multiplexing (CDM) groups, and K is a positive integer;

the first configuration information comprises a frequency-domain sub-carrier position parameter and a time-domain orthogonal frequency division multiplexing (OFDM) symbol position parameter of the K CDM groups.

3. The method according to claim 2, wherein in a case where a quantity of channel state information reference signal ports is 32 and a size of a CDM group of the K CDM groups is 2, K=16;

positions of the K CDM groups are $(k_0, l_0)$, $(k_1, l_0)$, $(k_2, l_0)$, $(k_3, l_0)$, $(k_0, l_0+1)$, $(k_1, l_0+1)$, $(k_2, l_0+1)$, $(k_3, l_0+1)$, $(k_0+12, l_0)$, $(k_1+12, l_0)$, $(k_2+12, l_0)$, $(k_3+12, l_0)$, $(k_0+12, l_0+1)$, $(k_1+12, l_0+1)$, $(k_2+12, l_0+1)$, $(k_3+12, l_0+1)$, respectively; corresponding CDM group indices are 0, 1, 2, 3, 4, 5, 6, 7, 8, 9, 10, 11, 12, 13, 14, 15, respectively;

or, positions of the K CDM groups are $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, $(k_0, l_0+1)$, $(k_1, l_0+1)$, $(k_2, l_0+1)$, $(k_3, l_0+1)$, $(k_0+12, l_0+1)$, $(k_1+12, l_0+1)$, $(k_2+12, l_0+1)$, $(k_3+12, l_0+1)$, respectively; corresponding CDM group indices are 0, 1, 2, 3, 4, 5, 6, 7, 8, 9, 10, 11, 12, 13, 14, 15, respectively;

wherein a first parameter in (,) represents a frequency-domain sub-carrier position of the CDM group, and a second parameter in (,) represents a time-domain OFDM symbol position; $k_0$, $k_1$, $k_2$ and $k_3$ are frequency-domain sub-carrier position parameters, and $l_0$ is a time-domain OFDM symbol position parameter; or in a case where a quantity of channel state information reference signal ports is 32 and a size of a CDM group of the K CDM groups is 4, K=8; positions of the K CDM groups are: $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, respectively; corresponding CDM group indices are 0, 1, 2, 3, 4, 5, 6, 7, respectively; wherein a first parameter in (,) represents a frequency-domain sub-carrier position of the CDM group, and a second parameter in (,) represents a time-domain OFDM symbol position; $k_0$, $k_1$, $k_2$ and $k_3$ are frequency-domain sub-carrier position parameters, and $l_0$ is a time-domain OFDM symbol position parameter; or in a case where a quantity of channel state information reference signal ports is 32 and a size of a CDM group of the K CDM groups is 8, K=4; positions of the K CDM groups are: $(k_0, l_0)$, $(k_1, l_0)$, $(k_0+12, l_0)$, $(k_1+12, l_0)$, respectively; corresponding CDM group indices are 0, 1, 2, 3, respectively; wherein a first parameter in (,) represents a frequency-domain sub-carrier position of the CDM group, and a second parameter in (,) represents a time-domain OFDM symbol position; $k_0$ and $k_1$ are frequency-domain sub-carrier position parameters, and $l_0$ is a time-domain OFDM symbol position parameter; or in a case where a quantity of channel state information reference signal ports is 24 and a size of a CDM group of the K CDM groups is 2, K=12; positions of the K CDM groups are: $(k_0, l_0)$, $(k_1, l_0)$, $(k_2, l_0)$, $(k_0, l_0+1)$, $(k_1, l_0+1)$, $(k_2, l_0+1)$, $(k_0+12, l_0)$, $(k_1+12, l_0)$, $(k_2+12, l_0)$, $(k_0+12, l_0 30 1)$, $(k_1+12, l_0+1)$, $(k_2+12, l_0+1)$; or $(k_0, l_0)$, $(k_1, l_0)$, $(k_2, l_0)$, $(k_0+12, l_0)$, $(k_1+12, l_0)$, $(k_2+12, l_0)$, $(k_0, l_0+1)$, $(k_1, l_0+1)$, $(k_2, l_0+1)$, $(k_0+12, l_0+1)$, $(k_1+12, l_0+1)$, $(k_2+12, l_0+1)$, respectively; corresponding CDM group indices are 0, 1, 2, 3, 4, 5, 6, 7, 8, 9, 10, 11, respectively; wherein a first parameter in (,) represents a frequency-domain sub-carrier position of the CDM group, and a second parameter in (,) represents a time-domain OFDM symbol position; $k_0$, $k_1$ and $k_2$ are frequency-domain sub-carrier position parameters, and $l_0$ is a time-domain OFDM symbol position parameter; or in a case where a quantity of channel state information reference signal ports is 24 and a size of a CDM group of the K CDM groups is 4, K=6; positions of the K CDM groups are: $(k_0, l_0)$, $(k_1, l_0)$, $(k_2, l_0)$, $(k_0+12, l_0)$, $(k_1+12, l_0)$, $(k_2+12, l_0)$, respectively; corresponding CDM group indices are 0, 1, 2, 3, 4, 5, respectively, wherein a first parameter in (,) represents a frequency-domain sub-carrier position of the CDM group, and a second parameter in (,) represents a time-domain OFDM symbol position, $k_0$, $k_1$ and $k_2$ are frequency-domain sub-carrier position parameters, and $l_0$ is a time-domain OFDM symbol position parameter; or in a case where a quantity of channel state information reference signal ports is 24 and a size of a CDM group of the K CDM groups is 8, K=3; positions of the K CDM groups are: $(k_0, l_0)$, $(k_1, l_0)$, $(k_0+12, l_0)$, respectively; corresponding CDM group indices are 0, 1, 2, respectively; wherein a first parameter in (,) indicates a frequency-domain sub-carrier position of the CDM group, and a second parameter in (,) represents a time-domain OFDM symbol position; $k_0$ and $k_1$ are frequency-domain sub-carrier position parameters, and $l_0$ is a time-domain OFDM symbol position parameter; or in a case where a quantity of channel state information reference signal ports in 16 and a size of a CDM group of the K CDM groups is 2, K=8; positions of the K CDM groups are: $(k_0, l_0)$, $(k_1, l_0)$, $(k_2, l_0)$, $(k_3, l_0)$, $(k_0+12, l_0)$, $(k_1+12, l_0)$, $(k_2+12, l_0)$, $(k_3+12, l_0)$, respectively; corresponding CDM group indices are 0, 1, 2, 3, 4, 5, 6, 7, respectively; wherein a first parameter in (,) represents a frequency-domain sub-carrier position of the CDM group, a second parameter in (,) represents a time-domain OFDM symbol position; $k_0$, $k_1$, $k_2$ and $k_3$ are frequency-domain sub-carrier position parameters, and $l_0$ is a time-domain OFDM symbol position parameter; or in a case where a quantity of channel state information reference signal ports is 16 and a size of a CDM group of the K CDM groups is 4, K=4; the positions of the K CDM groups are: $(k_0, l_0)$, $(k_1, l_0)$, $(k_0+12, l_0)$, $(k_1+12, l_0)$; the corresponding CDM group indices are 0, 1, 2, 3 respectively; wherein a first parameter in (,) represents a frequency-domain sub-carrier position of the CDM group, and a second parameter in (,) represents a time-domain OFDM symbol position; $k_0$ and $k_1$ are frequency-domain sub-carrier position parameters, and $l_0$ is a time-domain OFDM symbol position parameter.

4. The method according to claim 1, wherein the channel state information reference signal resource comprises K CDM groups, and K is a positive even number;

in the K CDM groups, a position of a CDM group with index 0 is different from a position of a CDM group with index K/2 by Q frequency-domain resource blocks, and the CDM group with index 0 has a same time-domain OFDM symbol position as the CDM group with index K/2, the Q frequency-domain resource blocks contain M frequency-domain sub-carriers, wherein Q and M are positive integers;

the first configuration information comprises a frequency-domain sub-carrier position parameter and a time-domain OFDM symbol position parameter of the CDM group with index 0; or the first configuration information comprises two time-domain OFDM symbol position parameters of the channel state information reference signal resource; in a case where a difference between the two time-domain OFDM symbol position parameters is less than 2, a time-domain position of the channel state information reference signal resource is determined according to one of the two time-domain OFDM symbol position parameters; in a case where the difference between the two time-domain OFDM symbol position parameters is greater than or equal to 2, the time-domain position of the channel state information reference signal resource is determined according to the two time-domain OFDM symbol position parameters.

5. The method according to claim 1, wherein the channel state information reference signal resource comprises T sets of CDM groups, where T is an integer greater than or equal to 1;

the first configuration information comprises a non-zero-power channel state information reference signal resource information element, the non-zero-power channel state information reference signal resource information element comprises T channel state information reference signal resource mapping elements, each of the channel state information reference signal resource mapping elements is used to indicate a position of a set of CDM groups.

6. The method according to claim 5, further comprising:

determining a number of a channel state information reference signal port according to an index of a CDM group of the T sets of CDM groups: p=N+s+jK;

wherein K represents a size of the CDM group, j represents an index of the CDM group, and s represents a code sequence index for code division multiplexing the channel state information reference signal of the channel state information reference signal port over a CDM group with index j, s is a non-negative integer less than K, and N is an initial number of the channel state information reference signal port and N is a non-negative integer;

wherein first channel state information reference signal resource mapping element indicates positions of a first set of CDM groups, comprising positions of $J_1$ CDM groups, where $J_1$ is an integer greater than or equal to 1, and indices of the $J_1$ CDM groups are mapped to 0, 1, . . . , $J_1-1$; second channel state information reference signal resource mapping element indicates posi-tions of second set of CDM groups, comprising posi-tions of $J_2$ CDM groups, where $J_2$ is an integer greater than or equal to 1, and indices of the $J_2$ CDM groups are mapped to $J_1$, $J_1+1$, . . . , $J_1+J_2-1$; wherein j is a non-negative integer less than $J_1+J_2$; or calculating a quantity of channel state information pro-cessing units occupied for receiving the channel state information reference signal according to the first con-figuration information, wherein the quantity of channel state information processing units occupied for receiv-ing the channel state information reference signal is T, where T is an integer greater than or equal to 1.

7. The method according to claim 1, wherein correspond-ing to $M_v$ being 2, the second group of vectors comprises a discrete fourier transform (DFT) vector with index 0 and a DFT vector with index $n_3^{(f)}$;

wherein an element in the DFT vector with index $n_3^{(f)}$ is represented as $$e^{\frac{2\pi n n_3^{(f)}}{N_3}},$$

wherein t is a non-negative integer less than $N_3$, and $N_3$ is a quantity of precoding matrices; and wherein $n_3^{(f)}$ is determined in one of the following ways: selected, by the precoding indicator, from 1 and $N_3-1$; selected, by the second configuration information, from 1 and $N_3-1$;

determined according to a quantity of precoding matrix subbands comprised in each channel quality indicator (CQI) subband of a plurality of CQI subbands.

8. The method according to claim 1, wherein $M_v$ being 1 indicates that a format of a channel quality indicator is a wideband channel quality indicator format.

9. The method according to claim 1, further comprising: determining $M_v$ according to at least one of P and L; or determining the L vectors according to the value of Mv.

10. The method according to claim 1, wherein $M_v$ meets at least one of:

corresponding to P being greater than or equal to a first threshold, $M_v$ is 2;

corresponding to P being less than or equal to a second threshold, $M_v$ is 2;

corresponding to P belonging to a first interval or a first set, $M_v$ is 2;

corresponding to L being greater than or equal to a third threshold, $M_v$ is 2;

corresponding to L being less than or equal to a fourth threshold, $M_v$ is 2;

corresponding to L belonging to a second interval or a second set, $M_v$ is 2;

corresponding to a ratio of L to P being greater than or equal to a fifth threshold, $M_v$ is 2;

corresponding to the ratio of L to P being less than or equal to a sixth threshold, $M_v$ is 2;

corresponding to the ratio of L to P belonging to a third interval or a third set, $M_v$ is 2;

wherein P is a quantity of channel state information reference signal ports.

11. The method according to claim 1, wherein a mapping relationship between channel state information reference signal ports and the L vectors meets the following:

corresponding to $M_v>1$, each of the channel state information reference signal ports corresponds to a vector, and corresponding to $M_v=1$, each of the L ports of the channel state information reference signal ports corresponds to a vector; or corresponding to $M_v>1$, each of the L ports of the channel state information reference signal ports corresponds to a vector, and corresponding to $M_v=1$, each of the channel state information reference signal ports corresponds to a vector.

12. The method according to claim 1, wherein the PMI is used to indicate a non-zero coefficient in the coefficients of $LM_v$ vector pairs composed of $L+M_v$ vectors, wherein a maximum value of quantities of non-zero coefficients in each layer is $K_0$, and $K_0$ is a positive integer.

13. The method according to claim 12, wherein $K_0$ is determined according to one of:

$K_0$ is determined according to a product of L and a second coefficient, the second coefficient is a positive number, and the second configuration information comprises the second coefficient;

$K_0$ is determined according to a product of P and a third coefficient, the third coefficient is a positive number, the second configuration information comprises the third coefficient;

$K_0$ is determined according to P;

$K_0$ is equal to L;

$K_0$ is equal to P;

wherein P is a quantity of channel state information reference signal ports; or the second configuration information comprises a combination parameter, and the combination parameter is used to indicate one of: the combination parameter is used to indicate L and a second coefficient, the second coefficient is a positive number, K0 is determined according to a product of L and the second coefficient; the combination parameter is used to indicate P and a third coefficient, the third coefficient is a positive number, K0 is determined according to a product of P and the third coefficient; the combination parameter is used to indicate P, a first coefficient and a second coefficient, the first coefficient is a positive number, the second coefficient is a positive number, L is determined according to P and the first coefficient, and K0 is determined according to a product of L and the second coefficient; wherein P is a quantity of channel state information reference signal ports.

14. The method according to claim 13, further comprising: determining a content indicated by the combination parameter according to $M_v$; and corresponding to $M_v=1$, the combination parameter is used to indicate P, a first coefficient and a second coefficient, and corresponding to $M_v>1$, the combination parameter is used to indicate P and a third coefficient; or, corresponding to $M_v=1$, the combination parameter is used to indicate L and a second coefficient, and corresponding to $M_v>1$, the combination parameter is used to indicate P and a third coefficient; or, corresponding to $M_v=1$, the combination parameter is used to indicate P and a third coefficient, and corresponding to $M_v>1$, the combination parameter is used to indicate P, a first coefficient and a second coefficient; or, corresponding to $M_v=1$, the combination parameter is used to indicate P and a third coefficient, and corresponding to $M_v>1$, the combination parameter is used to indicate L and a second coefficient.

15. The method according to claim 12, wherein $K_0$ is determined according to $M_v$; $K_0$ corresponding to $M_v>1$ is twice of a value of $K_0$ corresponding to $M_v=1$.

16. The method of claim 1, further comprising:

reporting at least one of the following capabilities according to a combination value of $M_v$ and R:

a maximum quantity of ports of each channel state information reference signal resource;

a maximum quantity of channel state information reference signal resources in each frequency band;

a total quantity of ports of channel state information reference signal resources in each frequency band;

wherein R represents a quantity of precoding matrix subbands comprised in each channel quality indiciator CQI subband of a plurality of CQI subbands; and wherein the combination value of $M_v$ and R comprises at least one of the combinations: $M_v$ is 1, and R is 1; $M_v$ is 2, and R is 1; $M_v$ is 1, and R is 2; $M_v$ is 2, and R is 2; $M_v$ is greater than 1, and R is 1; and $M_v$ is greater than 1, and R is 2.

17. A channel state information receiving method, comprising:

sending configuration information, the configuration information comprises first configuration information and second configuration information, the first configuration information is used to indicate a position of a channel state information reference signal resource, and the second configuration information is used to indicate a reporting parameter of channel state information;

sending a channel state information reference signal according to the first configuration information; and receiving channel state information according to the second configuration information;

wherein the channel state information comprises a precoding matrix indicator (PMI) which is used to indicate a precoding matrix, the precoding matrix is determined according to a first group of vectors and a second group of vectors;

wherein the first group of vectors comprises L vectors, the second group of vectors comprises My vectors, and L and My are positive integers; L is determined according to one of:

the second configuration information comprises P and a first coefficient, the first coefficient is a positive number, and L is determined according to P and the first coefficient; and L is equal to P;

wherein P is a quantity of channel state information reference signal ports.

18. A communication node, comprising a memory, a processor, and a computer program stored on the memory and runnable on the processor, wherein the processor executes the program to:

receive configuration information, the configuration information comprises first configuration information and second configuration information, the first configuration information is used to indicate a position of a channel state information reference signal resource, and the second configuration information is used to indicate a reporting parameter of channel state information;

receive a channel state information reference signal according to the first configuration information; and report the channel state information according to the second configuration information and a measurement of the channel state information reference signal;

wherein the channel state information comprises a precoding matrix indicator (PMI) which is used to indicate a precoding matrix, the precoding matrix is determined according to a first group of vectors and a second group of vectors;

wherein the first group of vectors comprises L vectors, the second group of vectors comprises My vectors, and L and My are positive integers; L is determined according to one of:

the second configuration information comprises P and a first coefficient, the first coefficient is a positive number, and L is determined according to P and the first coefficient; and L is equal to P;

wherein P is a quantity of channel state information reference signal ports.

19. A non-transitory computer-readable storage medium having stored a computer program thereon, wherein in response that the program is executed by a processor, the channel state information reporting method according to claim 1 is implemented.

* * * * *